United States Patent
Damnjanovic et al.

(10) Patent No.: US 10,326,577 B2
(45) Date of Patent: Jun. 18, 2019

(54) HARQ DESIGN FOR LTE IN UNLICENSED SPECTRUM UTILIZING INDIVIDUAL ACK/NACK

(71) Applicant: QUALCOMM Incorporated, San Diego, CA (US)

(72) Inventors: Aleksandar Damnjanovic, Del Mar, CA (US); Naga Bhushan, San Diego, CA (US); Wanshi Chen, San Diego, CA (US); Durga Prasad Malladi, San Diego, CA (US); Yongbin Wei, San Diego, CA (US); Tao Luo, San Diego, CA (US); Tingfang Ji, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/456,866

(22) Filed: Aug. 11, 2014

(65) Prior Publication Data

US 2015/0049708 A1  Feb. 19, 2015

Related U.S. Application Data

(60) Provisional application No. 61/865,507, filed on Aug. 13, 2013.

(51) Int. Cl.
*H04L 1/18* (2006.01)
*H04L 5/00* (2006.01)

(52) U.S. Cl.
CPC .......... *H04L 5/0053* (2013.01); *H04L 1/1812* (2013.01); *H04L 1/1829* (2013.01);
(Continued)

(58) Field of Classification Search
CPC ... H04L 5/0053; H04L 1/1854; H04L 1/1835; H04L 1/1812; H04L 1/1829; H04L 1/1874
See application file for complete search history.

(56) References Cited

U.S. PATENT DOCUMENTS

| 5,844,905 A | 12/1998 | McKay et al. |
| 7,882,412 B2 | 2/2011 | Nanda |

(Continued)

FOREIGN PATENT DOCUMENTS

| CN | 101079814 A | 11/2007 |
| CN | 101933280 A | 12/2010 |

(Continued)

OTHER PUBLICATIONS

Khiem, SR and HARQ Feedback Multiplexing, Jun. 7, 2012.*
(Continued)

*Primary Examiner* — Alex Skripnikov
*Assistant Examiner* — Richard Schnell
(74) *Attorney, Agent, or Firm* — Liem T. Do

(57) ABSTRACT

Methods, systems, and apparatuses are described for wireless communications. In one method, a sequence number corresponding to a data frame and one or more data subframes of the data frame may be transmitted over an unlicensed spectrum to a user equipment (UE), and hybrid automatic repeat request (HARQ) feedback for the one or more data subframes may be received over the unlicensed spectrum, from the UE, when the sequence number corresponding to the data frame is received by the UE in a specified order. In another method, a sequence number corresponding to a data frame and HARQ feedback may be transmitted over an unlicensed spectrum to a UE, and one or more data subframes may be received over the unlicensed spectrum, from the UE, in response to the HARQ feedback
(Continued)

when the sequence number corresponding to the data frame is received by the UE in a specified order.

26 Claims, 20 Drawing Sheets

(52) U.S. Cl.
CPC .......... *H04L 1/1835* (2013.01); *H04L 1/1854* (2013.01); *H04L 1/1874* (2013.01); *H04L 5/001* (2013.01); *H04L 5/0055* (2013.01)

(56) References Cited

U.S. PATENT DOCUMENTS

| | | | | |
|---|---|---|---|---|
| 8,320,341 | B2* | 11/2012 | Malkamaki | H04L 1/1812 370/336 |
| 8,503,436 | B2* | 8/2013 | Yi | H04L 1/1642 370/241 |
| 2004/0109433 | A1* | 6/2004 | Khan | H04L 1/1614 370/345 |
| 2005/0237932 | A1* | 10/2005 | Liu | H04L 1/0002 370/230 |
| 2007/0274264 | A1 | 11/2007 | Jiang | |
| 2009/0196294 | A1* | 8/2009 | Black | H04L 1/1607 370/394 |
| 2010/0122137 | A1* | 5/2010 | Kim | H04L 1/1867 714/751 |
| 2010/0278062 | A1* | 11/2010 | Abraham | H04W 72/085 370/252 |
| 2010/0309840 | A1* | 12/2010 | Umesh | H04L 1/0083 370/328 |
| 2011/0141901 | A1* | 6/2011 | Luo | H04L 1/1822 370/241 |
| 2012/0117446 | A1* | 5/2012 | Taghavi Nasrabadi | H04L 1/0003 714/776 |
| 2012/0327915 | A1* | 12/2012 | Kang | H04L 5/0007 370/336 |
| 2013/0061105 | A1* | 3/2013 | Chun | H04L 1/1822 714/748 |
| 2013/0337821 | A1* | 12/2013 | Clegg | H04L 5/0062 455/452.1 |
| 2014/0010086 | A1* | 1/2014 | Etemad | H04W 16/14 370/235 |
| 2014/0036818 | A1* | 2/2014 | Koskela | H04W 72/042 370/329 |
| 2016/0234717 | A1 | 8/2016 | Sugaya | |

FOREIGN PATENT DOCUMENTS

| | | |
|---|---|---|
| EP | 2391041 A1 | 11/2011 |
| JP | H05503197 A | 5/1993 |
| JP | H10135954 A | 5/1998 |
| JP | 2004343567 A | 12/2004 |
| WO | WO-1992010893 A1 | 6/1992 |
| WO | WO-2006041891 A2 | 4/2006 |
| WO | WO-2012078565 A1 | 6/2012 |
| WO | WO 2013166689 A1 * | 11/2013 ............ H04W 28/06 |

OTHER PUBLICATIONS

Sharetechnote.com; RLC; Jun. 2013; http://www.sharetechnote.com/html/RLC_LTE.html; pp. 7, 11.*

ISA/EPO, International Search Report and Written Opinion of the International Searching Authority, Int'l. App. No. PCT/US2014/050700, Oct. 21, 2014, European Patent Office, Rijswijk, NL, 13 pgs.

Nakajima et al., "A Simple and Efficient Selective Repeat Scheme for High Throughput WLAN, IEEE802.11n," 2007 IEEE 65th Vehicular Technology Conference, VTC2007-Spring, Dublin, Ireland, Apr. 22-25, 2007, pp. 1302-1306, ISSN 1550-2252, IEEE.

* cited by examiner

HARQ DESIGN FOR LTE IN UNLICENSED SPECTRUM UTILIZING INDIVIDUAL ACK/NACK

CROSS REFERENCES

The present Application for Patent claims priority to U.S. Provisional Patent Application No. 61/865,507 by Damnjanovic et al., entitled "HARQ DESIGN FOR LTE IN UNLICENSED SPECTRUM UTILIZING INDIVIDUAL ACK/NACK," filed Aug. 13, 2013, assigned to the assignee hereof, and expressly incorporated by reference herein.

BACKGROUND

Wireless communications networks are widely deployed to provide various communication services such as voice, video, packet data, messaging, broadcast, and the like. These wireless networks may be multiple-access networks capable of supporting multiple users by sharing the available network resources.

A wireless communications network may include a number of access points. The access points of a cellular network may include a number of base stations, such as NodeBs (NBs) or evolved NodeBs (eNBs). The access points of a wireless local area network (WLAN) may include a number of WLAN access points, such as WiFi nodes. Each access point may support communication for a number of user equipments (UEs) and may often communicate with multiple UEs at the same time. Similarly, each UE may communicate with a number of access points, and may sometimes communicate with multiple access points and/or access points employing different access technologies. An access point may communicate with a UE via downlink and uplink. The downlink (or forward link) refers to the communication link from the access point to the UE, and the uplink (or reverse link) refers to the communication link from the UE to the access point.

As cellular networks become more congested, operators are beginning to look at ways to increase capacity. One approach may include the use of WLANs to offload some of the traffic and/or signaling of a cellular network. WLANs (or WiFi networks) are attractive because, unlike cellular networks that operate in a licensed spectrum, WiFi networks generally operate in an unlicensed spectrum. However, the use of unlicensed spectrum by both cellular and WiFi devices may require the use of a contention-based protocol to gain access to the unlicensed spectrum. Thus, devices wanting to communicate over the unlicensed spectrum over multiple data frames may have to account for transmission gaps between data frames (e.g., gaps caused by other devices capturing the unlicensed spectrum and preventing the devices from communicating over the unlicensed spectrum during multiple adjacent data frames).

SUMMARY

The described features generally relate to one or more improved methods, systems, and/or apparatuses for wireless communications. More particularly, the described features relate to the transmission of data frames including data subframes and/or hybrid automatic repeat request (HARQ) feedback, in a wireless communications system in which devices wanting to communicate over an unlicensed spectrum over multiple data frames may have to account for transmission gaps between data frames.

In a first set of illustrative examples, a method for wireless communication is provided. A method for wireless communications may comprise transmitting, over an unlicensed spectrum to a UE, a sequence number corresponding to a data frame and one or more data subframes of the data frame. The method includes receiving, over the unlicensed spectrum from the UE, hybrid automatic repeat request (HARQ) feedback for the one or more data subframes when the sequence number corresponding to the data frame is received by the UE in a specified order.

In some examples, the HARQ feedback may not be transmitted by the UE for the one or more data subframes when the sequence number corresponding to the data frame is received by the UE out of order. The method may further include transmitting, over the unlicensed spectrum to the UE, a sequence number corresponding to a subsequent data frame and one or more data subframes of the subsequent data frame, and receiving, over the unlicensed spectrum from the UE, HARQ feedback for the one or more data subframes of the subsequent data frame when the sequence number for the subsequent data frame is received by the UE in the specified order.

In other examples, the method may comprise receiving a separate HARQ feedback message for each of the one or more data subframes. Receiving a HARQ feedback over the unlicensed spectrum for the one or more data subframes may comprise receiving HARQ feedback for a subset of the one or more data subframes during the data frame, and receiving HARQ feedback for a remaining subset of the one or more data subframes during a next data frame. In yet another example, receiving HARQ feedback over the unlicensed spectrum from the UE may comprise receiving HARQ feedback for each of the one or more data subframes during each one or more corresponding uplink subframes. Each corresponding uplink subframe may occur during the data frame or during a next data frame. The method may further include performing clear channel assessment (CCA) to determine availability of the unlicensed spectrum, and accessing the unlicensed spectrum during the data frame when a determination is made that the unlicensed spectrum is available. In some examples, the method may comprise transmitting a request to send (RTS) signal to request and reserve channel access over an unlicensed spectrum. In such instance, a clear to send (CTS) signal may be received when the unlicensed spectrum is available for transmission. Additionally or alternatively, the method may comprise transmitting a CTS signal when the unlicensed spectrum is available for transmission.

In a second set of illustrative examples, an apparatus for wireless communication is provided. The apparatus may include a processor and memory communicatively coupled with the processor. The processor may be configured to transmit, over an unlicensed spectrum to a UE, a sequence number corresponding to a data frame and one or more data subframes of the data frame. The processor may be further configured to receive, over the unlicensed spectrum from the UE, HARQ feedback for the one or more data subframes when the sequence number corresponding to the data frame is received by the UE in a specified order. In certain examples, the apparatus may implement one or more aspects of the method for wireless communications described above with respect to the first set of illustrative examples.

In a third set of illustrative examples, a method for wireless communications is provided. The method may include transmitting, over an unlicensed spectrum to a UE, a sequence number corresponding to a data frame and HARQ feedback. The method includes receiving, over the unlicensed spectrum from the UE, one or more data subframes in response to the HARQ feedback when the sequence number corresponding to the data frame is received by the UE in a specified order. The one or more data subframes may not be transmitted by the UE when the sequence number corresponding to the data frame is received by the UE out of order.

In some examples, the method may include transmitting, over the unlicensed spectrum to the UE, a sequence number corresponding to a subsequent data frame and subsequent HARQ feedback, and receiving, over the unlicensed spectrum from the UE, one or more additional data subframes in response to the subsequent HARQ feedback when the sequence number for the subsequent data frame is received by the UE in the specified order. The HARQ feedback may include one or more HARQ feedback messages, and receiving, over the unlicensed spectrum from the UE, one or more data subframes may include receiving a separate data subframe for each of the one or more HARQ feedback messages. Receiving, over the unlicensed spectrum from the UE, one or more data subframes may include receiving each of the one or more data subframes during each of one or more corresponding uplink subframes, wherein each corresponding uplink subframe occurs during the data frame. The HARQ feedback may include one or more uplink grants. The method may include performing CCA to determine availability of the unlicensed spectrum, and accessing the unlicensed spectrum during the data frame when a determination is made that the unlicensed spectrum is available.

In a fourth set of illustrative examples, an apparatus for wireless communications is provided. The apparatus for wireless communications may include a processor and memory communicatively coupled to the processor. The processor may be configured to transmit, over an unlicensed spectrum to a UE, a sequence number corresponding to a data frame and HARQ feedback. The processor may be further configured to receive, over the unlicensed spectrum from the UE, one or more data subframes in response to the HARQ feedback when the sequence number corresponding to the data frame is received by the UE in a specified order. In certain examples, the apparatus may implement one or more aspects of the method for wireless communications described above with respect to the third set of illustrative examples.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
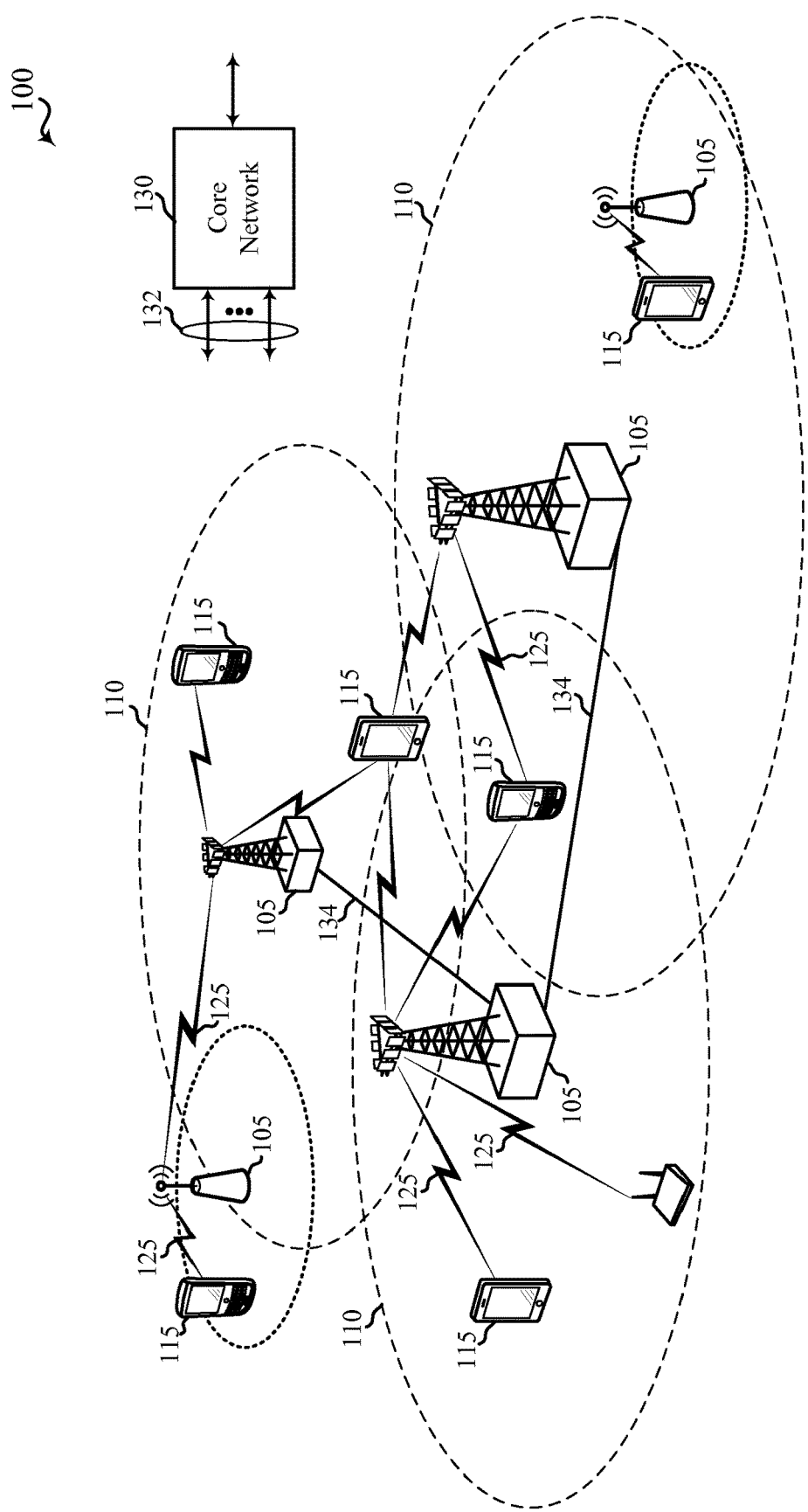
FIG. 1 shows a block diagram of a wireless communications system.

Methods, systems, and apparatuses are described in which unlicensed spectrum is used for LTE communications. Generally, operators have looked at WiFi as the primary mechanism to use unlicensed spectrum to relieve ever increasing levels of congestion in cellular networks. However, a new carrier type (NCT) based on LTE in an unlicensed spectrum may be compatible with carrier-grade WiFi, which makes LTE/LTE-A communications in an unlicensed or shared spectrum an alternative to WiFi solutions directed at relieving network congestion. LTE/LTE-A communications in an unlicensed or shared spectrum may leverage many LTE concepts and may introduce some modifications to physical layer (PHY) and media access control (MAC) aspects of the network or network devices to provide efficient operation in the unlicensed spectrum and to meet regulatory requirements. The unlicensed spectrum may range from 600 Megahertz (MHz) to 6 Gigahertz (GHz), for example. In some cases, LTE/LTE-A in an unlicensed or shared spectrum may perform significantly better than WiFi. For example, when an all LTE/LTE-A in an unlicensed or shared deployment (for single or multiple operators) is compared to an all WiFi deployment, or when there are dense small cell deployments, LTE/LTE-A in an unlicensed or shared may perform significantly better than WiFi. LTE/LTE-A in an unlicensed or shared may also perform better than WiFi in other cases such as when LTE/LTE-A in an unlicensed or shared is mixed with WiFi (for single or multiple operators).

The described features relate to the transmission of data frames including data subframes and/or HARQ feedback. In a wireless communications system in which devices want to communicate over an unlicensed spectrum over multiple data frames, the devices may have to account for transmission gaps between data frames. To account for these transmission gaps, the data frames of a transmission over the unlicensed spectrum may be assigned sequence numbers. The data frames may then be transmitted, along with the sequence numbers, in accord with a specified order of the sequence numbers. In some cases, consecutive sequence numbers may be assigned to data frames separated by transmission gaps. When a device receives the data frames in the specified order, the device may transmit HARQ feedback and/or data subframes in response. When a device does not receive a data frame in the specified order (e.g., the device receives a third data frame in a transmission before receiving the second data frame in the transmission), the device may not transmit any data subframes or HARQ feedback, thereby signaling that it received the data frame out of order.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system 100. The system 100 includes a plurality of access points (e.g., base stations, eNBs, or WLAN access points) 105, a number of user equipments (UEs) 115, and a core network 130. Some of the access points 105 may communicate with the UEs 115 under the control of a base station controller (not shown), which may be part of the core network 130 or certain access points 105 (e.g., base stations or eNBs) in various embodiments. Some of the access points 105 may communicate control information and/or user data with the core network 130 through backhaul 132. In one example, some of the access points 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communications link 125 may be a multi-carrier signal modulated according to various radio technologies. Each modulated signal may be sent on a different carrier and may carry control information (e.g., reference signals, control channels, etc.), overhead information, data, etc.

The access points 105 may wirelessly communicate with the UEs 115 via one or more access point antennas. Each of the access points 105 may provide communication coverage for a respective coverage area 110. In some examples, an access point 105 may be referred to as a base station, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a WiFi node or some other suitable terminology. The coverage area 110 for an access point may be divided into sectors making up only a portion of the coverage area (not shown). The system 100 may include access points 105 of different types (e.g., macro, micro, and/or pico base stations). The access points 105 may also utilize different radio technologies, such as cellular and/or WLAN radio access technologies. The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In some examples, the system 100 may include an LTE/LTE-A communications system (or network) that supports one or more modes of operation or deployment scenarios in an unlicensed or shared spectrum. In other embodiments, the system 100 may support wireless communications using an unlicensed spectrum and an access technology different from LTE/LTE-A in a licensed, unlicensed or shared spectrum. In LTE/LTE-A communications systems, the term evolved NodeB or eNB may be generally used to describe of the access points 105. The system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul 132 (e.g., through core network 130). The wireless communications system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNBs, pico eNBs, femto eNBs, relays, and the like. A UE 115 may also be able to communicate over different access networks, such as cellular or other WWAN access networks, or WLAN access networks.

The communications links 125 shown in system 100 may include uplinks for carrying uplink (UL) transmissions (e.g., from a UE 115 to an eNB 105) and/or downlinks for carrying downlink (DL) transmissions (e.g., from an eNB 105 to a UE 115). The UL transmissions may also be called reverse link transmissions, while the DL transmissions may also be called forward link transmissions. The downlink transmissions may be made using a licensed spectrum (e.g., LTE), LTE/LTE-A in an unlicensed or shared spectrum, or both. Similarly, the uplink transmissions may be made using a licensed spectrum (e.g., LTE), LTE/LTE-A in an unlicensed or shared spectrum, or both.

In some examples of the system 100, various deployment scenarios for LTE/LTE-A in an unlicensed or shared spectrum may be supported including a supplemental downlink mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., eNB) and a UE may take place in an unlicensed spectrum. Base stations or eNBs 105 as well as UEs 115 may support one or more of these or similar modes of operation. OFDMA communications signals may be used in the communications links 125 for LTE downlink transmissions in an unlicensed and/or a licensed spectrum, while SC-FDMA communications signals may be used in the communications links 125 for LTE uplink transmissions in an unlicensed and/or a licensed spectrum. Additional details regarding the implementation of LTE/LTE-A in an unlicensed or shared spectrum deployment scenarios or modes of operation in a system such as the system 100, as well as other features and functions related to the operation of LTE/LTE-A in an unlicensed or shared spectrum, are provided below with reference to FIGS. 2-16.

Figure 2A:
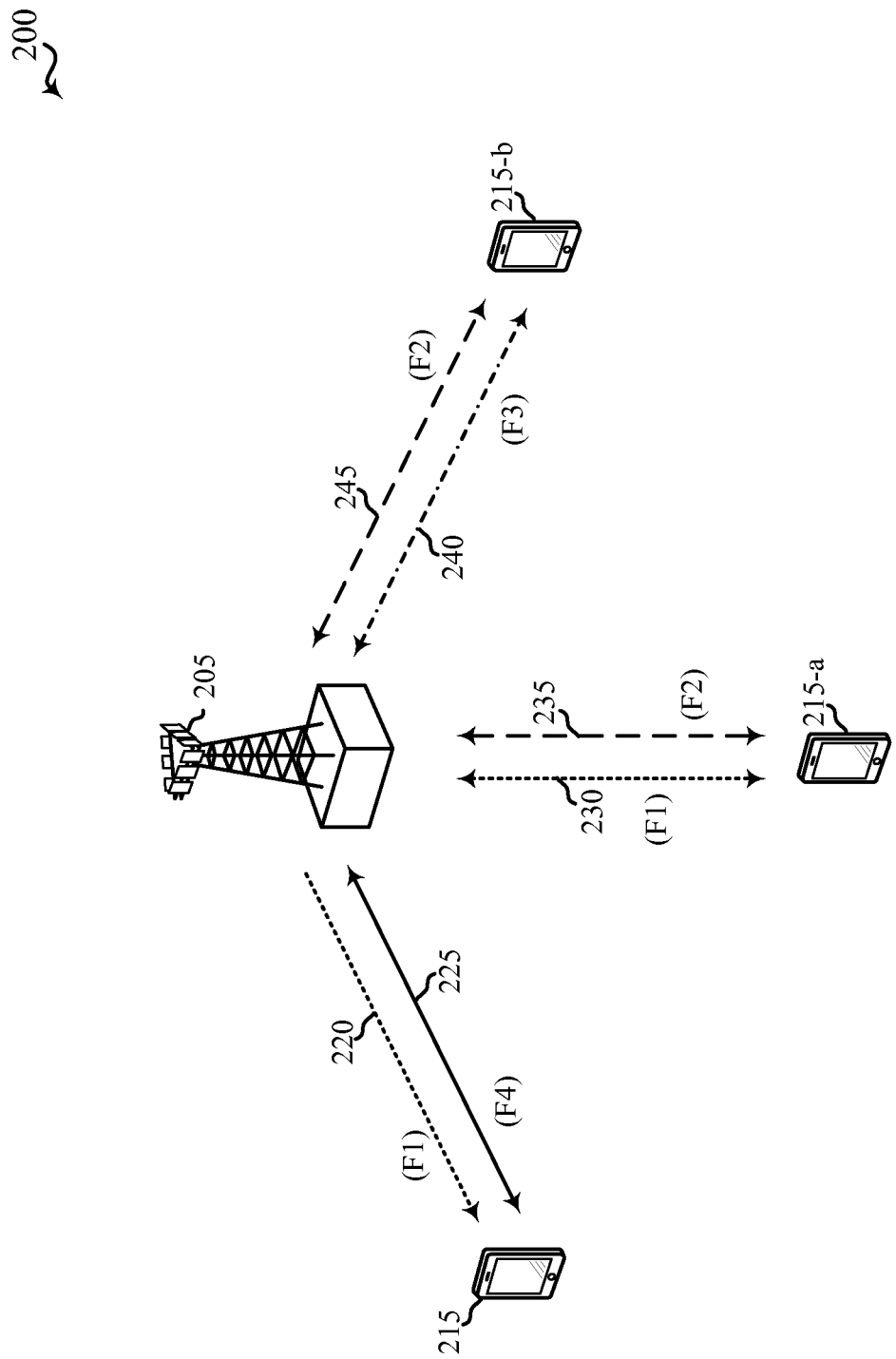
FIG. 2A shows a diagram that illustrates examples of deployment scenarios for using long term evolution (LTE) in an unlicensed spectrum according to various embodiments.

Turning next to FIG. 2A, a wireless communications system 200 illustrates examples of a supplemental downlink mode and of a carrier aggregation mode for an LTE network that supports LTE/LTE-A in an unlicensed or shared spectrum. The system 200 may be an example of portions of the system 100 of FIG. 1. Moreover, the base station 205 may be an example of the base stations 105 of FIG. 1, while the UEs 215, 215-a, and 215-b may be examples of the UEs 115 of FIG. 1.

In the example of a supplemental downlink mode in the system 200, the base station 205 may transmit OFDMA communications signals to a UE 215 using a downlink 220. The downlink 220 is associated with a frequency F1 in an unlicensed spectrum. The base station 205 may transmit OFDMA communications signals to the same UE 215 using a bidirectional link 225 and may receive SC-FDMA communications signals from that UE 215 using the bidirectional link 225. The bidirectional link 225 is associated with a frequency F4 in a licensed spectrum. The downlink 220 in the unlicensed spectrum and the bidirectional link 225 in the licensed spectrum may operate concurrently. The downlink 220 may provide a downlink capacity offload for the base station 205. In some examples, the downlink 220 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in the system 200, the base station 205 may transmit OFDMA communications signals to a UE 215-a using a bidirectional link 230 and may receive SC-FDMA communications signals from the same UE 215-a using the bidirectional link 230. The bidirectional link 230 is associated with the frequency F1 in the unlicensed spectrum. The base station 205 may also transmit OFDMA communications signals to the same UE 215-a using a bidirectional link 235 and may receive SC-FDMA communications signals from the same UE 215-a using the bidirectional link 235. The bidirectional link 235 is associated with a frequency F2 in a licensed spectrum. The bidirectional link 230 may provide a downlink and uplink capacity offload for the base station 205. Like the supplemental downlink described above, this scenario may occur with any service provider (e.g., MNO) that uses a licensed spectrum and needs to relieve some of the traffic and/or signaling congestion.

In another example of a carrier aggregation mode in the system 200, the base station 205 may transmit OFDMA communications signals to a UE 215-*b* using a bidirectional link 240 and may receive SC-FDMA communications signals from the same UE 215-*b* using the bidirectional link 240. The bidirectional link 240 is associated with a frequency F3 in an unlicensed spectrum. The base station 205 may also transmit OFDMA communications signals to the same UE 215-*b* using a bidirectional link 245 and may receive SC-FDMA communications signals from the same UE 215-*b* using the bidirectional link 245. The bidirectional link 245 is associated with the frequency F2 in the licensed spectrum. The bidirectional link 240 may provide a downlink and uplink capacity offload for the base station 205. This example and those provided above are presented for illustrative purposes and there may be other similar modes of operation or deployment scenarios that combine LTE and LTE/LTE-A in an unlicensed or shared spectrum for capacity offload.

As described above, the typical service provider that may benefit from the capacity offload offered by using LTE/LTE-A in an unlicensed or shared spectrum is a traditional MNO with LTE spectrum. For these service providers, an operational configuration may include a bootstrapped mode (e.g., supplemental downlink, carrier aggregation) that uses the LTE primary component carrier (PCC) on the licensed spectrum and the LTE/LTE-A in an unlicensed or shared spectrum secondary component carrier (SCC) on the unlicensed spectrum.

In the carrier aggregation mode, data and control may generally be communicated in LTE (e.g., bidirectional links 225, 235, and 245) while data may generally be communicated in LTE/LTE-A in an unlicensed or shared spectrum (e.g., bidirectional links 230 and 240). The carrier aggregation mechanisms supported when using LTE/LTE-A in an unlicensed or shared spectrum may fall under a hybrid frequency division duplexing-time division duplexing (FDD-TDD) carrier aggregation or a TDD-TDD carrier aggregation with different symmetry across component carriers.

Figure 2B:
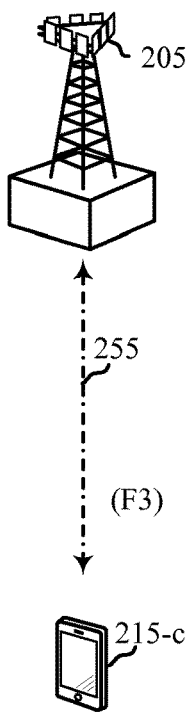
FIG. 2B shows a diagram that illustrates an example of a standalone mode using LTE in an unlicensed spectrum according to various embodiments.

FIG. 2B shows a wireless communications system 250 that illustrates an example of a standalone mode for LTE/LTE-A in an unlicensed or shared spectrum. The system 250 may be an example of portions of the system 100 of FIG. 1. Moreover, the base station 205 may be an example of the base stations 105 and/or 205 described with reference to FIGS. 1 and/or 2A, while the UE 215-*c* may be an example of the UEs 115 and/or 215 of FIGS. 1 and/or 2A.

In the example of a standalone mode in system 250, the base station 205 may transmit OFDMA communications signals to the UE 215-*c* using a bidirectional link 255 and may receive SC-FDMA communications signals from the UE 215-*c* using the bidirectional link 255. The bidirectional link 255 may be associated with the frequency F3 in an unlicensed spectrum described above with reference to FIG. 2A. The standalone mode may be used in non-traditional wireless access scenarios, such as in-stadium access (e.g., unicast, multicast). The typical service provider for this mode of operation may be a stadium owner, cable company, event host, hotel, enterprise, or large corporation that does not have licensed spectrum.

In some examples, a transmitting device such as an eNB 105 and/or 205 described with reference to FIGS. 1, 2A, and/or 2B, or a UE 115 and/or 215 described with reference to FIGS. 1, 2A, and/or 2B, may use a gating interval to gain access to a channel of the unlicensed spectrum. The gating interval may define the application of a contention-based protocol, such as a Listen Before Talk (LBT) protocol based on the LBT protocol specified in ETSI (EN 301 893). When using a gating interval that defines the application of an LBT protocol, the gating interval may indicate when a transmitting device needs to perform a Clear Channel Assessment (CCA). The outcome of the CCA indicates to the transmitting device whether a channel of the unlicensed spectrum is available or in use. When the CCA indicates that the channel is available (e.g., "clear" for use), the gating interval may allow the transmitting device to use the channel—typically for a predefined transmission period. When the CCA indicates that the channel is not available (e.g., in use or reserved), the gating interval may prevent the transmitting device from using the channel during the transmission period.

In some cases, it may be useful for a transmitting device to generate a gating interval on a periodic basis and synchronize at least one boundary of the gating interval with at least one boundary of a periodic frame structure. For example, it may be useful to generate a periodic gating interval for a cellular downlink in an unlicensed spectrum, and to synchronize at least one boundary of the periodic gating interval with at least one boundary of a periodic frame structure (e.g., LTE radio frame) associated with the cellular downlink. Examples of such synchronization are shown in FIG. 3.

Figure 3:
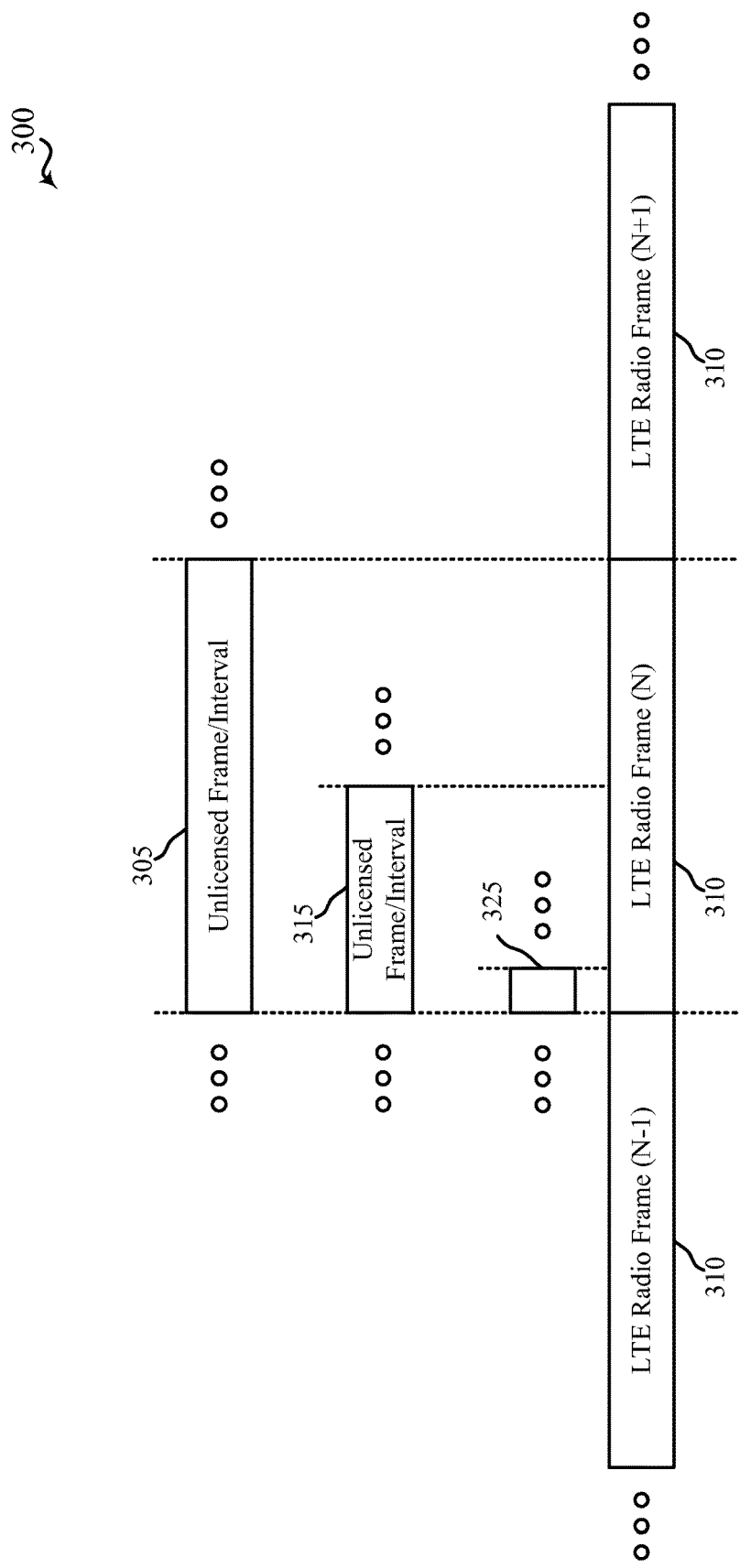
FIG. 3 shows various examples of unlicensed frames/intervals and their relationships to a period frame structure including, for example, LTE radio frames.

FIG. 3 illustrates examples 300 of an unlicensed frame/interval 305, 315, and/or 325 for a cellular downlink in an unlicensed spectrum. The unlicensed frame/interval 305, 315, and/or 325 may be used as a periodic gating interval by an eNB that supports transmissions over an unlicensed spectrum. Examples of such an eNB may be the access points 105 and/or eNBs 205 described with reference to FIGS. 1, 2A, and/or 2B. The unlicensed frame/interval 305, 315, and/or 325 may be used with the system 100, 200, and/or 250 described with reference to FIGS. 1, 2A, and/or 2B.

By way of example, the duration of the unlicensed frame/interval 305 is shown to be equal to (or approximately equal to) an LTE radio frame 310 of a periodic frame structure associated with a cellular downlink. In some examples, "approximately equal" means the duration of the unlicensed frame/interval 305 is within a cyclic prefix (CP) duration of the duration of the periodic frame structure.

At least one boundary of the unlicensed frame/interval 305 may be synchronized with at least one boundary of the periodic frame structure that includes the LTE radio frames N−1 to N+1. In some cases, the unlicensed frame/interval 305 may have boundaries that are aligned with the frame boundaries of the periodic frame structure. In other cases, the unlicensed frame/interval 305 may have boundaries that are synchronized with, but offset from, the frame boundaries of the periodic frame structure. For example, the boundaries of the unlicensed frame/interval 305 may be aligned with subframe boundaries of the periodic frame structure, or with subframe midpoint boundaries (e.g., the midpoints of particular subframes) of the periodic frame structure.

In some cases, the periodic frame structure may include LTE radio frames N−1 to N+1. Each LTE radio frame 310 may have a duration of ten milliseconds, for example, and the unlicensed frame/interval 305 may also have a duration of ten milliseconds. In these cases, the boundaries of the unlicensed frame/interval 305 may be synchronized with the boundaries (e.g., frame boundaries, subframe boundaries, or subframe midpoint boundaries) of one of the LTE radio frames (e.g., the LTE radio frame (N)).

By way of example, the duration of the unlicensed frames/intervals 315 and 325 are shown to be sub-multiples of (or approximate sub-multiples of) the duration of the periodic frame structure associated with the cellular downlink. In some examples, an "approximate sub-multiple of" means the duration of the unlicensed frame/interval 315, 325 is within a cyclic prefix (CP) duration of the duration of a sub-multiple of (e.g., half or one-tenth) the periodic frame structure. For example, the unlicensed frame/interval 315 may have a duration of five milliseconds and the unlicensed frame/interval 325 may have a duration of 1 or 2 milliseconds.

Figure 4:
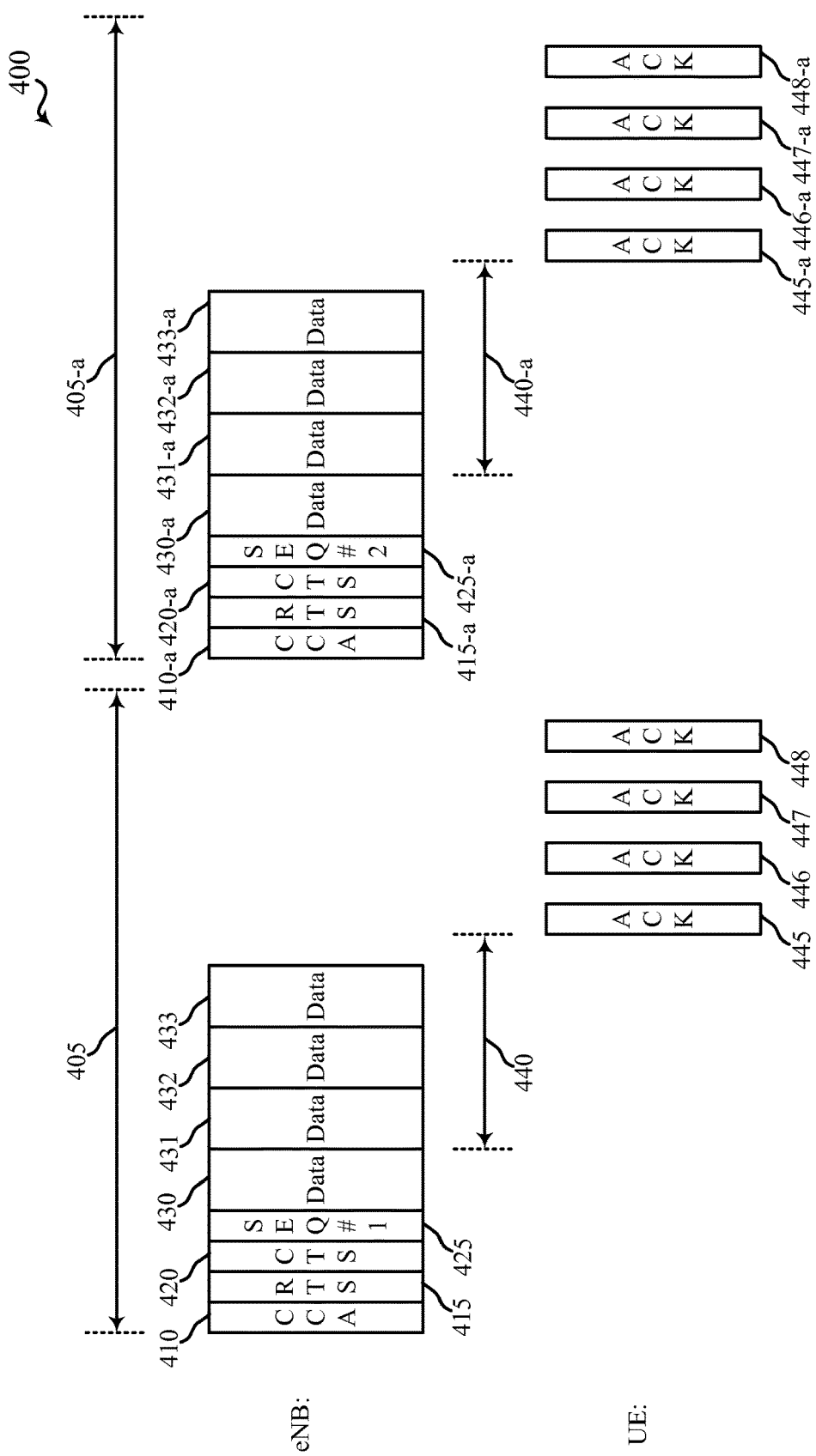
FIGS. 4 and 5 illustrates an exemplary use of an unlicensed frames/intervals during a downlink mode of operation.

FIG. 4 illustrates an example use 400 of unlicensed frames/intervals 405, 405-a. In some examples, the unlicensed frames/intervals 405, 405-a may be examples of frames used by one or more of the eNBs 105 and/or 205 described with reference to FIGS. 1, 2A, and/or 2B. The unlicensed frame/interval 405 may include a CCA slot period 410, a Request To Send (RTS) signal period 415, a Clear To Send (CTS) signal period 420, a sequence number (or sequence number period) 425, and/or a number of data subframes 430, 431, 432, 433. In some cases, the unlicensed frame/interval 405 may have a duration of five or ten milliseconds.

The CCA slot period 410 may include one or more CCA slots. In some cases, one of the CCA slots may be pseudo-randomly selected by an eNB for performing CCA to determine availability of an unlicensed spectrum. The CCA slots may be pseudo-randomly selected such that some or all of the eNBs of a same operator deployment perform CCA in a common one of the CCA slots, and the eNBs of different operator deployments perform CCA in different ones of the CCA slots. In successive instances of the unlicensed frame/interval 405, the pseudo-random selection of CCA slots may result in different operator deployments selecting the first of the CCA slots. In this manner, each of a number of operator deployments may be given the first chance to perform CCA (e.g., a first operator deployment may select the first CCA slot in one unlicensed frame/interval, a second operator deployment may select the first CCA slot in a subsequent frame/interval, etc.). In some instances, the CCA slots may each have a duration of approximately 20 microseconds.

When an eNB performs CCA to determine availability of an unlicensed spectrum and determines that the unlicensed spectrum is available, the eNB may reserve a transmission period for transmitting one or more data subframes 430, 431, 432, 433. In some cases, multiple coordinated eNBs (e.g., two or more coordinated eNBs) may reserve the transmission period and transmit data. The simultaneous use of the transmission period by more than one eNB may be possible as a result of orthogonal transmissions, multiplexed transmissions, and/or the use of other time and/or frequency sharing mechanisms employed by a set of coordinated eNBs.

Optionally, the RTS and CTS signal periods 415, 420 may be used to request and reserve channel access over an unlicensed spectrum (e.g., instead of or along with using CCA).

Upon transmitting each of one or more data subframes 430, 431, 432, 433 to a UE, the UE may respond to the eNB with hybrid automatic repeat request (HARQ) feedback 445, 446, 447, 448. By way of example, the HARQ feedback 445, 446, 447, 448 may indicate to the eNB whether the one or more data subframes 430, 431, 432, 433 were successfully received and decoded by the UE (e.g., via an acknowledgement (ACK) or non-acknowledgement (NACK)). In some cases, the HARQ feedback may be transmitted as a separate HARQ feedback message 445, 446, 447, 448 for each of the one or more data subframes 430, 431, 432, 433. Each HARQ feedback message (e.g., message 445) may be transmitted after a decoding delay 440 following the receipt of a corresponding data subframe 430 by the UE.

In accord with various examples, the UE may transmit the HARQ feedback messages 445, 446, 447, 448 after determining that the sequence number (SEQ #1) corresponding to the data frame 405 is received in a specified order (e.g., the data frame 405 is received as the first data frame in a transmission). Subsequently, the eNB may transmit a subsequent data frame 405-a including a CCA slot period 410-a, an RTS signal period 415-a, a CTS signal period 420-a, a sequence number (or sequence number period) 425-a, and/or a number of data subframes 430-a, 431-a, 432-a, 433-a. When the UE receives the sequence number (SEQ #2) of the subsequent data frame 405-a, the UE may determine that the subsequent data frame 405-a is received in the specified order (e.g., the subsequent data frame 405-a is received as the second data frame in a transmission) and proceed to transmit HARQ feedback messages 445-a, 446-a, 447-a, 448-a for the data subframes 430-a, 431-a, 432-a, 433-a following respective decoding delays (e.g., delay 440-a).

Figure 5:
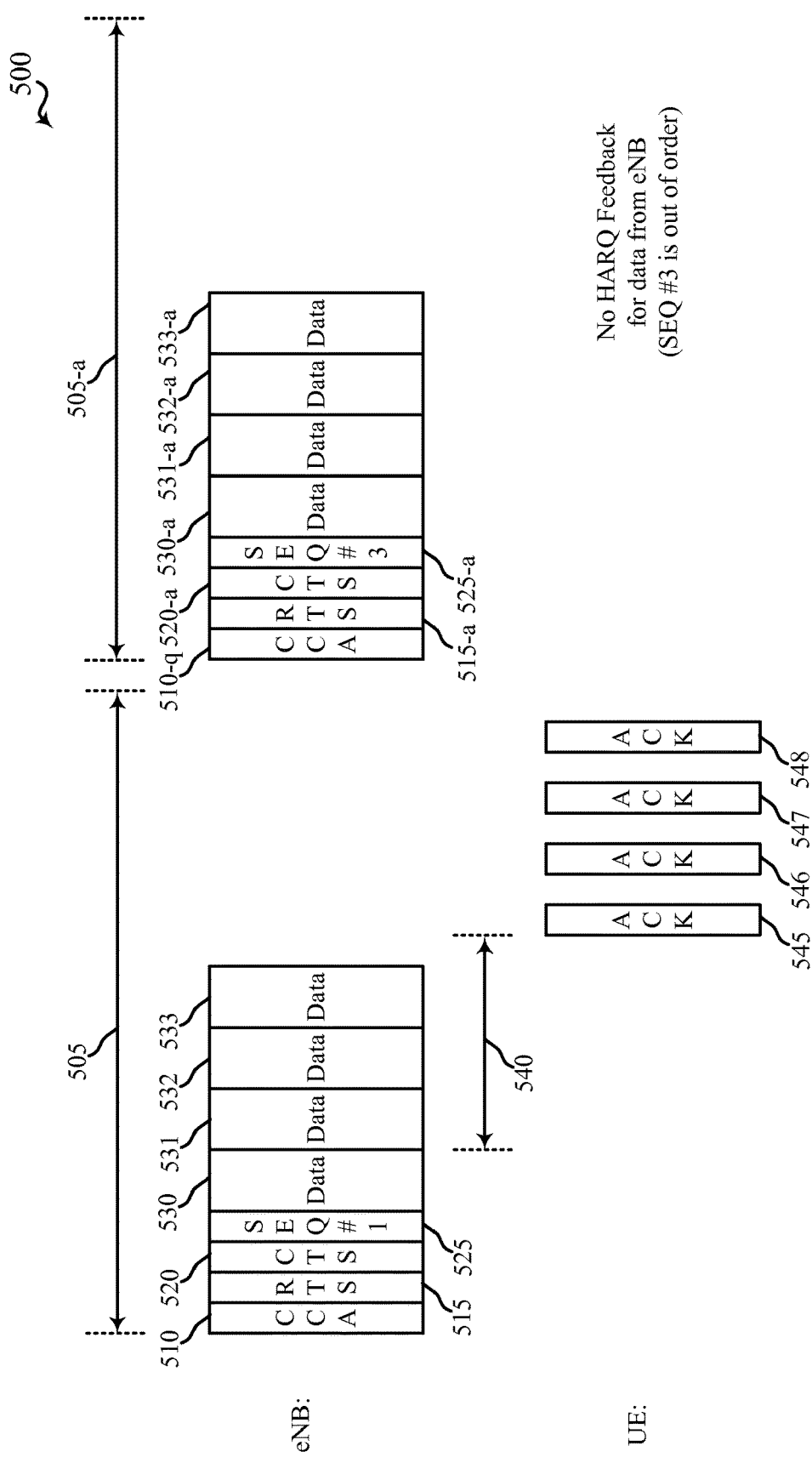

FIG. 5 illustrates an example use 500 of unlicensed frame/intervals 505, 505-a. In some examples, the unlicensed frames/intervals 505, 505-a may be examples of frames used by one or more of the eNBs 105 and/or 205 described with reference to FIGS. 1, 2A, and/or 2B. The unlicensed frame/interval 505 may include a CCA slot period 510, an RTS signal period 515, a CTS signal period 520, a sequence number (or sequence number period) 525, and/or a number of data subframes 530, 531, 532, 533. In some cases, the unlicensed frame/interval 505 may have a duration of five or ten milliseconds.

The CCA slot period 510 may include one or more CCA slots. In some cases, one of the CCA slots may be pseudo-randomly selected by an eNB for performing CCA to determine availability of an unlicensed spectrum. The CCA slots may be pseudo-randomly selected such that some or all of the eNBs of a same operator deployment perform CCA in a common one of the CCA slots, and the eNBs of different operator deployments perform CCA in different ones of the CCA slots. In successive instances of the unlicensed frame/interval 405, the pseudo-random selection of CCA slots may result in different operator deployments selecting the first of the CCA slots. In this manner, each of a number of operator deployments may be given the first chance to perform CCA (e.g., a first operator deployment may select the first CCA slot in one unlicensed frame/interval, a second operator deployment may select the first CCA slot in a subsequent frame/interval, etc.). In some instances, the CCA slots may each have a duration of approximately 20 microseconds.

When an eNB performs CCA to determine availability of an unlicensed spectrum and determines that the unlicensed spectrum is available, the eNB may reserve a transmission period for transmitting one or more data subframes 530, 531, 532, 533. In some cases, multiple coordinated eNBs (e.g., two or more coordinated eNBs) may reserve the transmission period and transmit data. The simultaneous use of the transmission period by more than one eNB may be possible as a result of orthogonal transmissions, multiplexed transmissions, and/or the use of other time and/or frequency sharing mechanisms employed by a set of coordinated eNBs.

Optionally, the RTS and CTS signal periods 515, 520 may be used to request and reserve channel access over an unlicensed spectrum (e.g., instead of or along with using CCA).

Upon transmitting each of one or more data subframes 530, 531, 532, 533 to a UE, the UE may respond to the eNB with hybrid automatic repeat request (HARQ) feedback 545, 546, 547, 548. By way of example, the HARQ feedback 545, 546, 547, 548 may indicate to the eNB whether the one or more data subframes 530, 531, 532, 533 were successfully received and decoded by the UE (e.g., via an acknowledgement (ACK) or non-acknowledgement (NACK)). In some cases, the HARQ feedback may be transmitted as a separate HARQ feedback message 545, 546, 547, 548 for each of the one or more data subframes 530, 531, 532, 533. Each HARQ feedback message (e.g., message 545) may be transmitted after a decoding delay 540 following the receipt of a corresponding data subframe 530 by the UE.

In accord with various examples, the UE may transmit the HARQ feedback messages 545, 546, 547, 548 after determining that that sequence number (SEQ #1) corresponding to the data frame 505 is received in a specified order (e.g., the data frame 505 is received as the first data frame in a transmission). Subsequently, the eNB may transmit a subsequent data frame 505-*a* including a CCA slot period 510-*a*, an RTS signal period 515-*a*, a CTS signal period 520-*a*, a sequence number (or sequence number period) 525-*a*, and/or a number of data subframes 530-*a*, 531-*a*, 532-*a*, 533-*a*. When the UE receives the sequence number (SEQ #3) of the subsequent data frame 505-*a*, the UE may determine that the subsequent data frame 505-*a* is received out of order (e.g., the subsequent data frame 505-*a* is the second data frame received by the UE, but its sequence number (SEQ #3) indicates that it is the third data frame in a transmission) and not transmit HARQ feedback for the one or more data subframes 530-*a*, 531-*a*, 532-*a*, 533-*a*. Because the eNB does not receive any HARQ feedback, it may retransmit the data frame (or the contents of the data frame) corresponding to sequence number SEQ #2, as well as the data frame 505-*a* (or the contents of the data frame 505-*a*).

Figure 6:
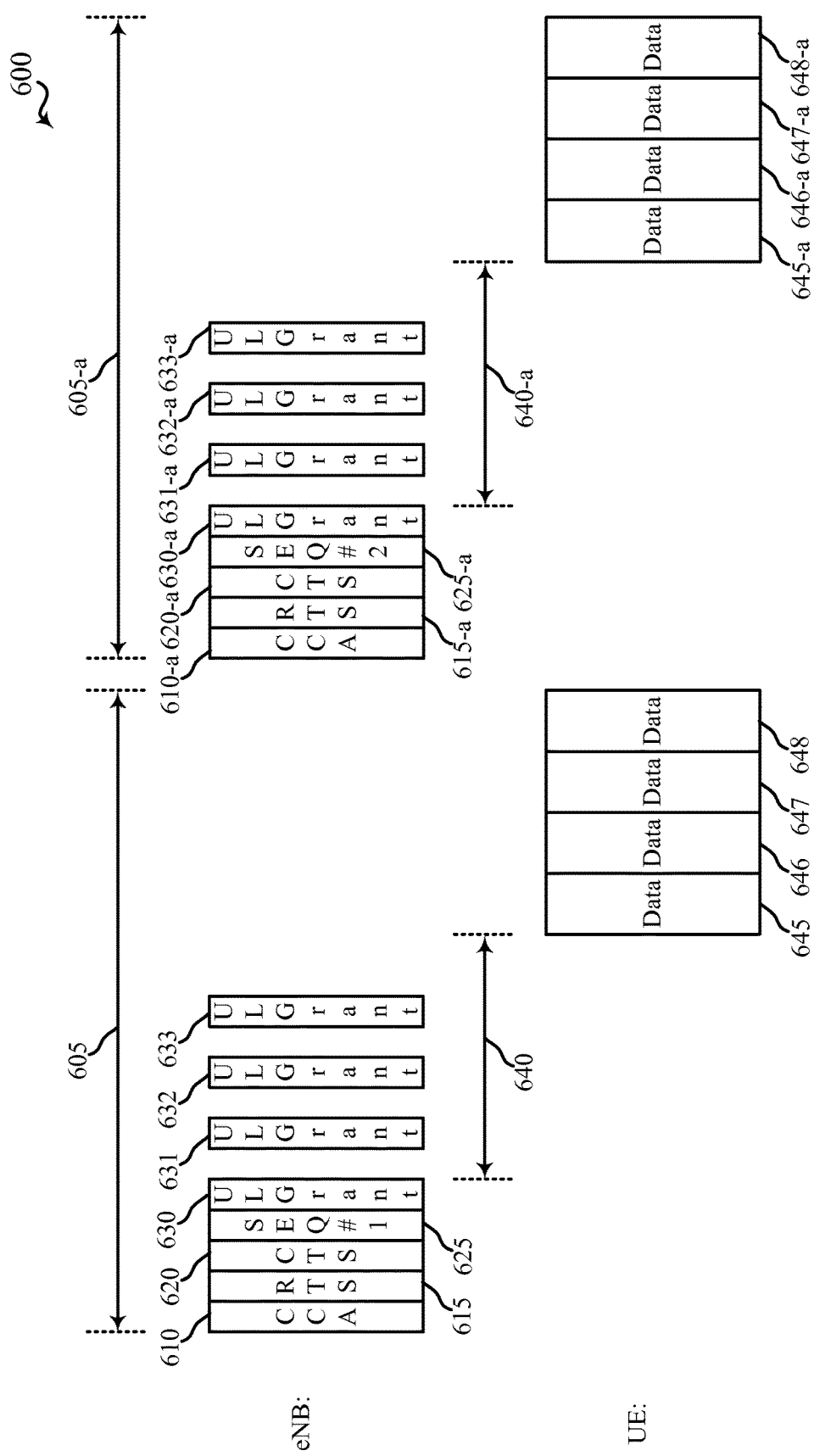
FIGS. 6 and 7 illustrate exemplary uses of an unlicensed frames/intervals during an uplink mode of operation.

FIG. 6 illustrates an example use 600 of unlicensed frames/intervals 605, 605-*a*. In some examples, the unlicensed frames/intervals 605, 605-*a* may be examples of frames used by one or more of the eNBs 105 and/or 205 described with reference to FIGS. 1, 2A, and/or 2B. The unlicensed frame/interval 605 may include a CCA slot period 610, an RTS signal period 615, a CTS signal period 620, a sequence number (or sequence number period) 625, and/or a number of HARQ feedback messages 630, 631, 632, 633 including uplink grants. In some cases, the unlicensed frame/interval 605 may have a duration of five or ten milliseconds.

The CCA slot period 610 may include one or more CCA slots. In some cases, one of the CCA slots may be pseudo-randomly selected by an eNB for performing CCA to determine availability of an unlicensed spectrum. The CCA slots may be pseudo-randomly selected such that some or all of the eNBs of a same operator deployment perform CCA in a common one of the CCA slots, and the eNBs of different operator deployments perform CCA in different ones of the CCA slots. In successive instances of the unlicensed frame/interval 605, the pseudo-random selection of CCA slots may result in different operator deployments selecting the first of the CCA slots. In this manner, each of a number of operator deployments may be given the first chance to perform CCA (e.g., a first operator deployment may select the first CCA slot in one unlicensed frame/interval, a second operator deployment may select the first CCA slot in a subsequent frame/interval, etc.). In some instances, the CCA slots may each have a duration of approximately 20 microseconds.

When an eNB performs CCA to determine availability of an unlicensed spectrum and determines that the unlicensed spectrum is available, the eNB may reserve a transmission period for transmitting one or more HARQ feedback messages 630, 631, 632, 633. In some cases, multiple coordinated eNBs (e.g., two or more coordinated eNBs) may reserve the transmission period and transmit data. The simultaneous use of the transmission period by more than one eNB may be possible as a result of orthogonal transmissions, multiplexed transmissions, and/or the use of other time and/or frequency sharing mechanisms employed by a set of coordinated eNBs.

Optionally, the RTS and CTS signal periods 615, 620 may be used to request and reserve channel access over an unlicensed spectrum (e.g., instead of or along with using CCA).

Upon transmitting each of one or more HARQ feedback messages 630, 631, 632, 633 to a UE, the UE may respond to the eNB by transmitting one or more data subframes 645, 646, 647, 648. Each data subframe (e.g., message 645) may be transmitted after a decoding delay 640 following the receipt of a corresponding uplink grant (e.g., the uplink grant included with HARQ feedback 630).

In accord with various examples, the UE may transmit the data subframes 645, 646, 647, 648 after determining that that sequence number (SEQ #1) corresponding to the data frame 605 is received in a specified order (e.g., the data frame 605 is received as the first data frame in a transmission). Subsequently, the eNB may transmit a subsequent data frame 605-*a* including a CCA slot period 610-*a*, an RTS signal period 615-*a*, a CTS signal period 620-*a*, a sequence number (or sequence number period) 625-*a*, and/or a number of HARQ feedback messages 630-*a*, 631-*a*, 632-*a*, 633-*a*. When the UE receives the sequence number (SEQ #2) of the subsequent data frame 605-*a*, the UE may determine that the subsequent data frame 605-*a* is received in the specified order (e.g., the subsequent data frame 605-*a* is received as the second data frame in a transmission) and proceed to transmit one or more data subframes 645-*a*, 646-*a*, 647-*a*, 648-*a* in response to the HARQ feedback messages 630-*a*, 631-*a*, 632-*a*, 633-*a* following respective decoding delays (e.g., delay 640-*a*).

Figure 7:
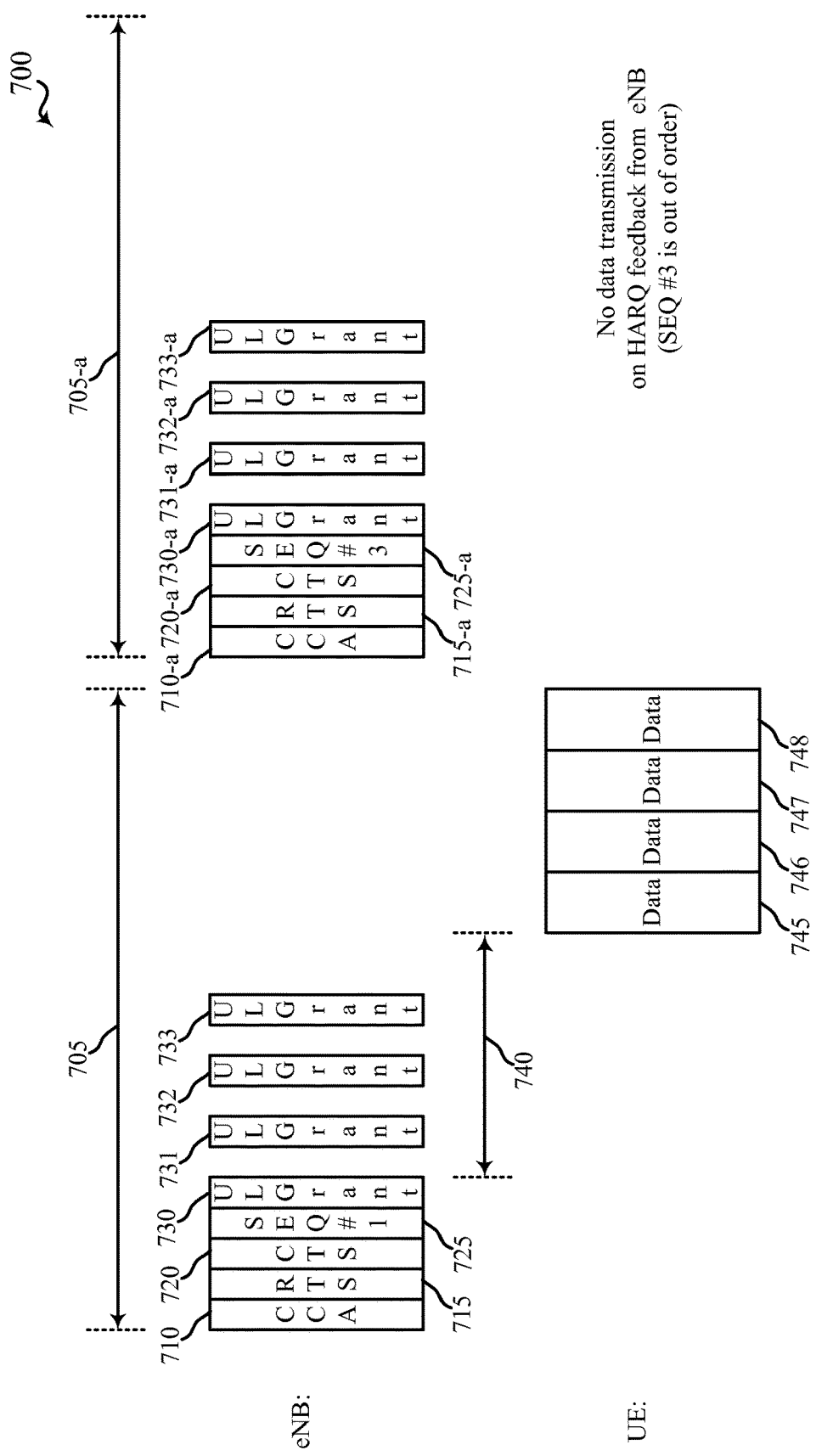

FIG. 7 illustrates an example use 700 of unlicensed frames/intervals 705, 705-*a*. In some examples, the unlicensed frames/intervals 705, 705-*a* may be examples of frames used by one or more of the eNBs 105 and/or 205 described with reference to FIGS. 1, 2A, and/or 2B. The unlicensed frame/interval 705 may include a CCA slot period 710, an RTS signal period 715, a CTS signal period 720, a sequence number (or sequence number period) 725, and/or a number of HARQ feedback messages 730, 731, 732, 733 including uplink grants. In some cases, the unlicensed frame/interval 705 may have a duration of five or ten milliseconds.

The CCA slot period 710 may include one or more CCA slots. In some cases, one of the CCA slots may be pseudo-randomly selected by an eNB for performing CCA to determine availability of an unlicensed spectrum. The CCA slots may be pseudo-randomly selected such that some or all of the eNBs of a same operator deployment perform CCA in a common one of the CCA slots, and the eNBs of different operator deployments perform CCA in different ones of the CCA slots. In successive instances of the unlicensed frame/interval 705, the pseudo-random selection of CCA slots may result in different operator deployments selecting the first of the CCA slots. In this manner, each of a number of operator deployments may be given the first chance to perform CCA (e.g., a first operator deployment may select the first CCA slot in one unlicensed frame/interval, a second operator deployment may select the first CCA slot in a subsequent frame/interval, etc.). In some instances, the CCA slots may each have a duration of approximately 20 microseconds.

When an eNB performs CCA to determine availability of an unlicensed spectrum and determines that the unlicensed spectrum is available, the eNB may reserve a transmission period for transmitting one or more HARQ feedback messages 730, 731, 732, 733. In some cases, multiple coordinated eNBs (e.g., two or more coordinated eNBs) may reserve the transmission period and transmit data. The simultaneous use of the transmission period by more than one eNB may be possible as a result of orthogonal transmissions, multiplexed transmissions, and/or the use of other time and/or frequency sharing mechanisms employed by a set of coordinated eNBs.

Optionally, the RTS and CTS signal periods 715, 720 may be used to request and reserve channel access over an unlicensed spectrum (e.g., instead of or along with using CCA). For example, the eNB may transmit a request to send (RTS) signal to reserve channel access over the unlicensed spectrum, and receive, in response to the RTS signal, a CTS signal identifying when the unlicensed spectrum is available for transmission. Additionally or alternatively, the eNB may transmit a CTS signal to itself to denote when the unlicensed spectrum is available for transmission.

Upon transmitting each of one or more HARQ feedback messages 730, 731, 732, 733 to a UE, the UE may respond to the eNB by transmitting one or more data subframes 745, 746, 747, 748. Each data subframe (e.g., data subframe 745) may be transmitted after a decoding delay 740 following the receipt of a corresponding uplink grant (e.g., the uplink grant included with HARQ feedback 730).

In accord with various examples, the UE may transmit the data subframes 745, 746, 747, 748 after determining that that sequence number (SEQ #1) corresponding to the data frame 705 is received in a specified order (e.g., the data frame 705 is received as the first data frame in a transmission). Subsequently, the eNB may transmit a subsequent data frame 705-*a* including a CCA slot period 710-*a*, an RTS signal period 715-*a*, a CTS signal period 720-*a*, a sequence number (or sequence number period) 725-*a*, and/or a number of HARQ feedback messages 730-*a*, 731-*a*, 732-*a*, 733-*a*. When the UE receives the sequence number (SEQ #3) of the subsequent data frame 705-*a*, the UE may determine that the subsequent data frame 705-*a* is received out of order (e.g., the subsequent data frame 505-*a* is the second data frame received by the UE, but its sequence number (SEQ #3) indicates that it is the third data frame in a transmission) and not transmit any data subframes in response to the uplink grants of the HARQ feedback messages 730-*a*, 731-*a*, 732-*a*, 733-*a*. Because the eNB does not receive any data subframes, it may retransmit the data frame (or the contents of the data frame) corresponding to sequence number SEQ #2, as well as the data frame 705-*a* or the contents of the data frame 705-*a*.

Figure 8A:
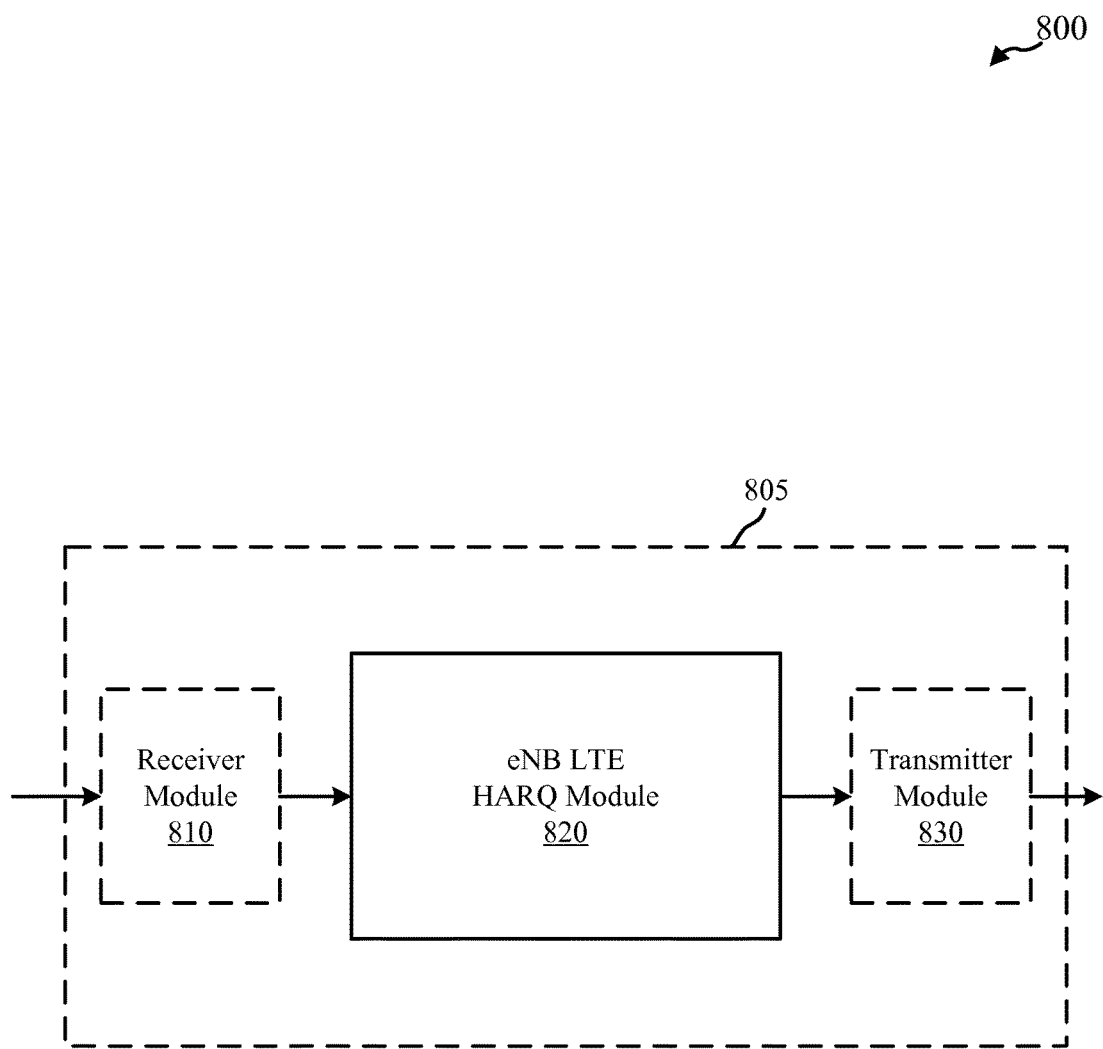
FIGS. 8A and 8B show block diagrams of examples of devices, such as eNBs, for use in wireless communications according to various embodiments.

Referring now to FIG. 8A, a block diagram 800 illustrates a device 805 for use in wireless communications in accordance with various examples. In some examples, the device 805 may be an example of one or more aspects of the eNBs 105 and/or 205 described with reference to FIGS. 1, 2A, and/or 2B. The device 805 may also be a processor. The device 805 may include a receiver module 810, an eNB LTE HARQ module 820, and/or a transmitter module 830. Each of these components may be in communication with each other.

The components of the device 805 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 810 may be or include a radio frequency (RF) receiver, such as an RF receiver operable to receive transmissions in a licensed spectrum (e.g., an LTE spectrum) and/or an unlicensed spectrum. The receiver module 810 may be used to receive various types of data and/or control signals (i.e., transmissions) over one or more communication links of a wireless communications system including the licensed and unlicensed spectrums, such as one or more communication links of the wireless communications system 100, 200, and/or 250 described with reference to FIGS. 1, 2A, and/or 2B.

In some examples, the transmitter module 830 may be or include an RF transmitter, such as an RF transmitter operable to transmit in the licensed spectrum and/or the unlicensed spectrum. The transmitter module 830 may be used to transmit various types of data and/or control signals (i.e., transmissions) over one or more communication links of a wireless communications system, such as one or more communication links of the wireless communications system 100, 200, and/or 250 described with reference to FIGS. 1, 2A, and/or 2B.

In some examples or modes of operation (e.g., in a downlink mode of operation between the device 805 and a UE), the eNB LTE HARQ module 820 may transmit a sequence number corresponding to a data frame and one or more data subframes of the data frame over an unlicensed spectrum to a UE. An example transmission of a sequence number 425 corresponding to a data frame 405 and one or more data subframes 430, 431, 432, 433 is described with reference to FIG. 4. When the sequence number corresponding to the data frame is received by the UE in a specified order (e.g., numerical order), the eNB LTE HARQ module 820 may receive, from the UE, HARQ feedback for the one or more data subframes. The HARQ feedback may be received over the unlicensed spectrum. An example transmission of HARQ feedback 445, 446, 447, 448 is also described with reference to FIG. 4.

In some examples or modes of operation (e.g., in an uplink mode of operation between the device 805 and a UE), the eNB LTE HARQ module 820 may transmit a sequence number corresponding to a data frame and HARQ feedback over an unlicensed spectrum to a UE. In some cases, the HARQ feedback may include one or more uplink grants. An example transmission of a sequence number 625 corresponding to a data frame 605 and HARQ feedback including uplink grants 630, 631, 632, 633 is described with reference to FIG. 6. When the sequence number corresponding to the data frame is received by the UE in a specified order (e.g., numerical order), the eNB LTE HARQ module 820 may receive one or more data subframes, from the UE, in response to the HARQ feedback. The one or more data subframes may be received over the unlicensed spectrum. An example transmission of one or more data subframes 645, 646, 647, 648 is described with reference to FIG. 6.

Figure 8B:
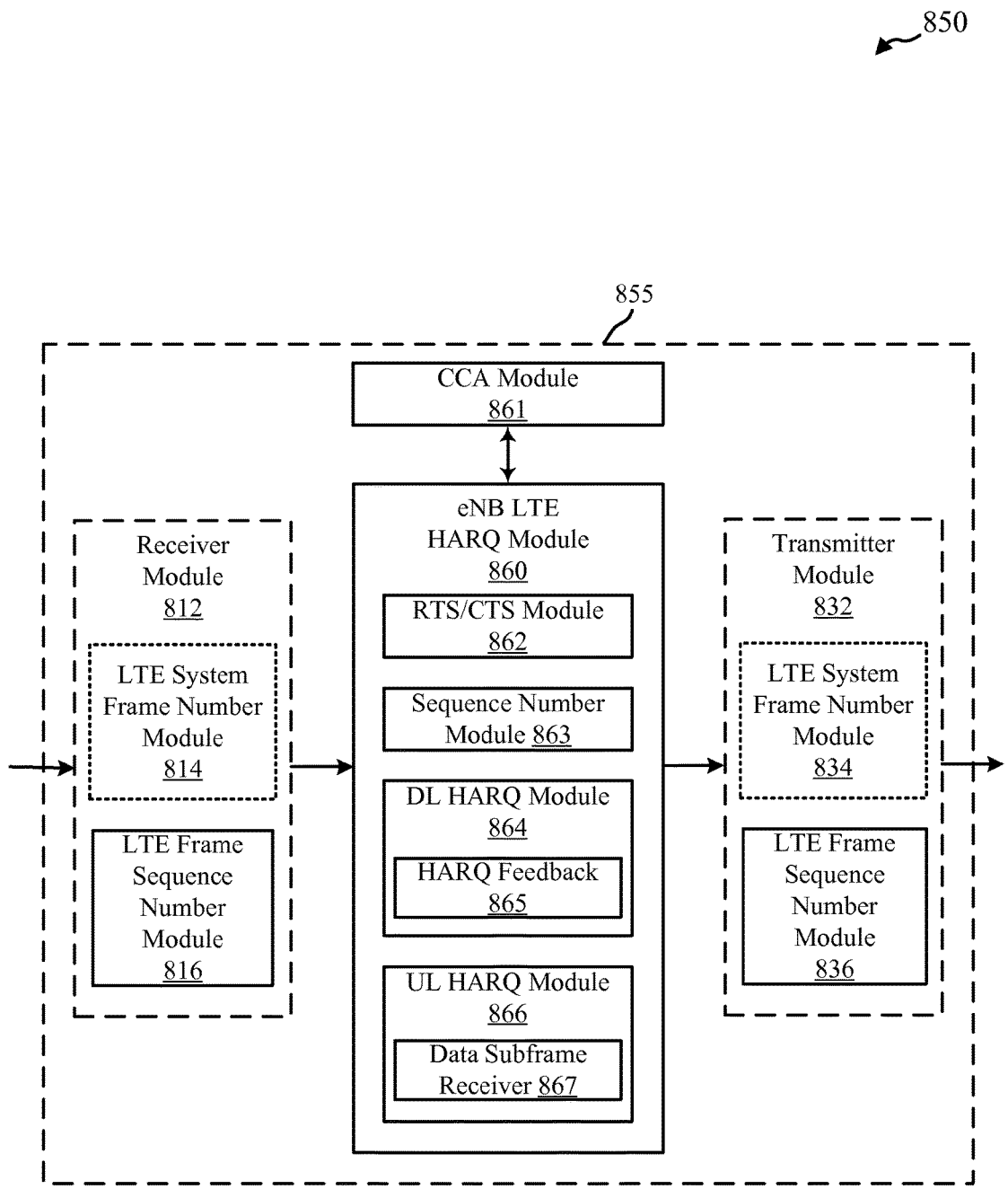

Referring now to FIG. 8B, a block diagram 850 illustrates a device 855 for use in wireless communications in accordance with various embodiments. In some examples, the device 855 may be an example of one or more aspects of the eNBs 105, 205, and/or 805 described with reference to FIGS. 1, 2A, 2B, and/or 8. The device 855 may also be a processor. The device 855 may include a receiver module 812, an eNB LTE HARQ module 860, a CCA module 861, and/or a transmitter module 832. Each of these components may be in communication with each other.

The components of the device 855 may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 812 may be or include a radio frequency (RF) receiver, such as an RF receiver operable to receive transmissions in a licensed spectrum (e.g., an LTE spectrum) and/or an unlicensed spectrum. The RF receiver may include separate receivers for the licensed spectrum and the unlicensed spectrum. The separate receivers may in some cases take the form of an LTE system frame number (SFN) module 814 and an LTE frame sequence number module 816. The LTE SFN module 814 may be used to receive LTE frames according to the use of SFNs and the LTE frame sequence number module 816 may be used to receive LTE/LTE-A in an unlicensed or shared spectrum frames according to the use of sequence numbers. The LTE SFN module 814 may be optional (as shown by the dotted lines) when the device 855 is used for LTE/LTE-A in an unlicensed or shared spectrum operations. The receiver module 812, including the modules 814 and/or 816, may be used to receive various types of data and/or control signals (i.e., transmissions) over one or more communication links of a wireless communications system including the licensed and unlicensed spectrums, such as one or more communication links of the wireless communications system 100, 200, and/or 250 described with reference to FIGS. 1, 2A, and/or 2B.

In some examples, the transmitter module 832 may be or include an RF transmitter, such as an RF transmitter operable to transmit in the licensed spectrum and/or the unlicensed spectrum. The RF transmitter may include separate transmitters for the licensed spectrum and the unlicensed spectrum. The separate transmitters may in some cases take the form of an LTE SFN module 834 and an LTE frame sequence number module 836. The LTE SFN module 834 may be used to receive LTE frames according to the use of SFNs and the LTE frame sequence number module 836 may be used to receive LTE/LTE-A in an unlicensed or shared spectrum frames according to the use of sequence numbers. The LTE SFN module 834 may be optional (as shown by the dotted lines) when the device 855 is used for LTE operations. The transmitter module 832, including the modules 834 and 836, may be used to transmit various types of data and/or control signals (i.e., transmissions) over one or more communication links of a wireless communications system, such as one or more communication links of the wireless communications system 100, 200, and/or 250 described with reference to FIGS. 1, 2A, and/or 2B.

In some examples, the CCA module 861 may perform CCA to determine availability of an unlicensed spectrum. When a determination is made that the unlicensed spectrum is available, the unlicensed spectrum may be accessed during a data frame to which the CCA applies. The CCA module 861 may perform a respective CCA for each data frame during which it desires to access the unlicensed spectrum.

The eNB LTE HARQ module 860 may be an example of the eNB LTE HARQ module 820 described with reference to FIG. 8A and may include an RTS/CTS module 862, a sequence number module 863, a DL HARQ module 864, and/or a UL HARQ module 866. Each of these components may be in communication with each other.

The RTS/CTS module 862 may be used to reserve channel access over an unlicensed spectrum using RTS/CTS messages and/or self-addressed CTS messages. In some examples, the RTS/CTS module 862 may be used to request and reserve channel access over an unlicensed spectrum (e.g., instead of or along with using the CCA module 961). For example, the RTS/CTS module 862 may transmit a request to send (RTS) signal to reserve channel access over the unlicensed spectrum. In other examples, the RTS/CTS module 862 may transmit the RTS signal to determine availability of the unlicensed spectrum or to request channel access over the unlicensed spectrum. In response, the RTS/CTS module 862 may receive a clear to send (CTS) signal identifying when the unlicensed spectrum is available for transmission. Additionally or alternatively, the RTS/CTS module 862 may transmit a CTS signal to itself to denote when the unlicensed spectrum is available for transmission.

In some examples, the sequence number module 863 may generate a sequence number for each of a number of data frames to be transmitted over an unlicensed spectrum. By way of example, the sequence numbers may be generated in numerical order or some other order known or conveyed to the UE (or UEs) with which the device 855 communicates. When transmitted to a UE in conjunction with the transmission of a data frame, the sequence number corresponding to the data frame enables a UE to determine whether the data frame is received in a specified order or received out of order. When the data frame is received by the UE in the specified order, the UE may respond to transmissions of the device 855 by transmitting HARQ feedback and/or one or more data subframes to the device 855. When the data frame is received by the UE out of order, the UE may not respond to the device 855, thereby signaling to the device 855 that a missing, corrupted, or otherwise not decodable data frame needs to be retransmitted to the UE.

The DL HARQ module 864 may be used in a downlink mode of operation of the device 855 (e.g., a downlink mode between the device 855 and a UE). In such a mode, the DL HARQ module 864 may transmit a sequence number corresponding to a data frame and one or more data subframes of the data frame over an unlicensed spectrum to a UE. The sequence number may be obtained from the sequence number module 863, and the transmission of the sequence number may be made via the unlicensed spectrum module 836 of the transmitter module 832. An example transmission of a sequence number 425 corresponding to a data frame 405 and one or more data subframes 430, 431, 432, 433, as may be accomplished using the DL HARQ module 864, is described with reference to FIG. 4.

When the sequence number corresponding to the data frame is received by the UE in a specified order (e.g., numerical order), a HARQ feedback module 865 of the DL HARQ module 864 may receive, from the UE, HARQ feedback for the one or more data subframes. However, when the sequence number corresponding to the data frame is received by the UE out of order, the UE may not transmit HARQ feedback for the one or more data subframes, and the HARQ feedback module 865 may not receive any HARQ feedback. When received, the HARQ feedback may be received over the unlicensed spectrum via the unlicensed spectrum module 816 of the receiver module 812. An example transmission of HARQ feedback 445, 446, 447, 448, as may be made by a UE to the device 855, is described with reference to FIG. 4. An example out of order sequence number 525-a and non-transmission of HARQ feedback is described with reference to FIG. 5.

In some cases, the HARQ feedback module 865 may receive HARQ feedback for a subset of the plurality of data subframes in the current data frame, and receive HARQ feedback for a remaining subset of the plurality of data subframes (i.e., data subframes in the current data frame) during a next data frame. That is, when the number of UL subframes available to provide the HARQ feedback in a current frame is smaller than the number of HARQ messages being provided, then the remaining HARQ messages (those not yet provided) may be provided in UL subframes in a subsequent frame.

In some cases, a separate HARQ feedback message may be received for each of a plurality of data subframes in a current data frame. The HARQ feedback messages may be received in the current data frame and/or a next data frame.

In some examples, HARQ feedback may be received for each of the one or more data subframes in a data frame during each of a plurality of corresponding uplink subframes. Some or all of the uplink subframes may occur during the current data frame and/or during a next data frame.

The UL HARQ module 866 may be used in an uplink mode of operation of the device 855 (e.g., an uplink mode between the device 855 and a UE). In such a mode, the UL HARQ module 866 may transmit a sequence number corresponding to a data frame and HARQ feedback over an unlicensed spectrum to a UE. The sequence number may be obtained from the sequence number module 863, and the transmission of the sequence number may be made via the unlicensed spectrum module 836 of the transmitter module 832. In some cases, the HARQ feedback may include one or more uplink grants. An example transmission of a sequence number 625 corresponding to a data frame 605 and HARQ feedback including uplink grants 630, 631, 632, 633 is described with reference to FIG. 6.

When the sequence number corresponding to the data frame is received by the UE in a specified order (e.g., numerical order), a data subframe receiver module 867 of the UL HARQ module 866 may receive one or more data subframes, from the UE, in response to the HARQ feedback. However, when the sequence number corresponding to the data frame is received by the UE out of order, the UE may not transmit the one or more data subframes, and the data subframe receiver module 867 may not receive any data subframes. When received, the one or more data subframes may be received over the unlicensed spectrum via the unlicensed spectrum module 816 of the receiver module 812. An example transmission of one or more data subframes 645, 646, 647, 648 is described with reference to FIG. 6. An example out of order sequence number 725-a and non-transmission of one or more data subframes is described with reference to FIG. 7.

In some cases, the HARQ feedback may include one or more HARQ feedback messages, and a separate data subframe may be received for each of the one or more HARQ feedback messages. Each HARQ feedback message may include a separate uplink grant.

In some cases, each of one or more data subframes may be received by the data subframe receiver module 867 during each of one or more corresponding uplink subframes, and each corresponding uplink subframe may occur during a current data frame.

Figure 9A:
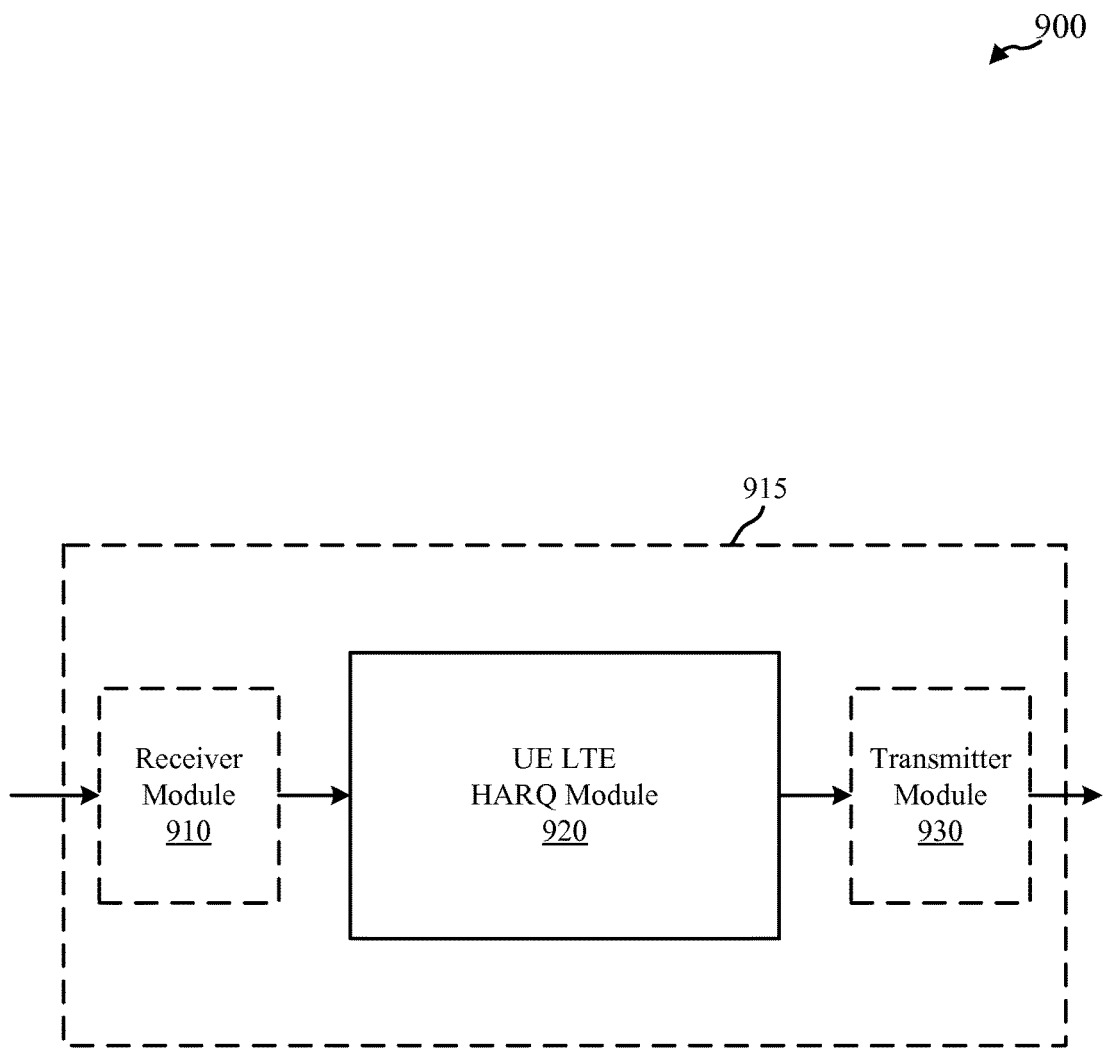
FIGS. 9A and 9B show block diagrams of examples of devices, such as UEs, for use in wireless communications according to various embodiments.

Referring now to FIG. 9A, a block diagram 900 illustrates a device 915 for use in wireless communications in accordance with various examples. In some examples, the device 915 may be an example of one or more aspects of the UEs 115 and/or 215 described with reference to FIGS. 1, 2A, and/or 2B. The device 915 may also be a processor. The device 915 may include a receiver module 910, a UE LTE HARQ module 920, and/or a transmitter module 930. Each of these components may be in communication with each other.

The components of the device 915 may, individually or collectively, be implemented with one or more application-specific integrated circuits ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 910 may be or include a radio frequency (RF) receiver, such as an RF receiver operable to receive transmissions in a licensed spectrum (e.g., an LTE spectrum) and/or an unlicensed spectrum. The receiver module 910 may be used to receive various types of data and/or control signals (i.e., transmissions) over one or more communication links of a wireless communications system including the licensed and unlicensed spectrums, such as one or more communication links of the wireless communications system 100, 200, and/or 250 described with reference to FIGS. 1, 2A, and/or 2B.

In some examples, the transmitter module 930 may be or include an RF transmitter, such as an RF transmitter operable to transmit in the licensed spectrum and/or the unlicensed spectrum. The transmitter module 930 may be used to transmit various types of data and/or control signals (i.e., transmissions) over one or more communication links of a wireless communications system, such as one or more communication links of the wireless communications system 100, 200, and/or 250 described with reference to FIGS. 1, 2A, and/or 2B.

In some examples or modes of operation (e.g., in a downlink mode of operation between an eNB and the device 915), the UE LTE HARQ module 920 may receive a sequence number corresponding to a data frame and one or more data subframes of the data frame over an unlicensed spectrum. An example transmission of a sequence number 425 corresponding to a data frame 405 and one or more data subframes 430, 431, 432, 433 is described with reference to FIG. 4. When the sequence number corresponding to the data frame is received by the device 915 in a specified order (e.g., numerical order), the UE LTE HARQ module 920 may transmit HARQ feedback for the one or more data subframes. The HARQ feedback may be transmitted over the unlicensed spectrum. An example transmission of HARQ feedback 445, 446, 447, 448 is also described with reference to FIG. 4.

In some examples or modes of operation (e.g., in an uplink mode of operation between an eNB and the device 915), the UE LTE HARQ module 920 may receive a sequence number corresponding to a data frame and HARQ feedback over an unlicensed spectrum. In some cases, the HARQ feedback may include one or more uplink grants. An example transmission of a sequence number 625 corresponding to a data frame 605 and HARQ feedback including uplink grants 630, 631, 632, 633 is described with reference to FIG. 6. When the sequence number corresponding to the data frame is received by the device 915 in a specified order (e.g., numerical order), the UE LTE HARQ module 920 may transmit one or more data subframes in response to the HARQ feedback. The one or more data subframes may be transmitted over the unlicensed spectrum. An example transmission of one or more data subframes 645, 646, 647, 648 is described with reference to FIG. 6.

Figure 9B:
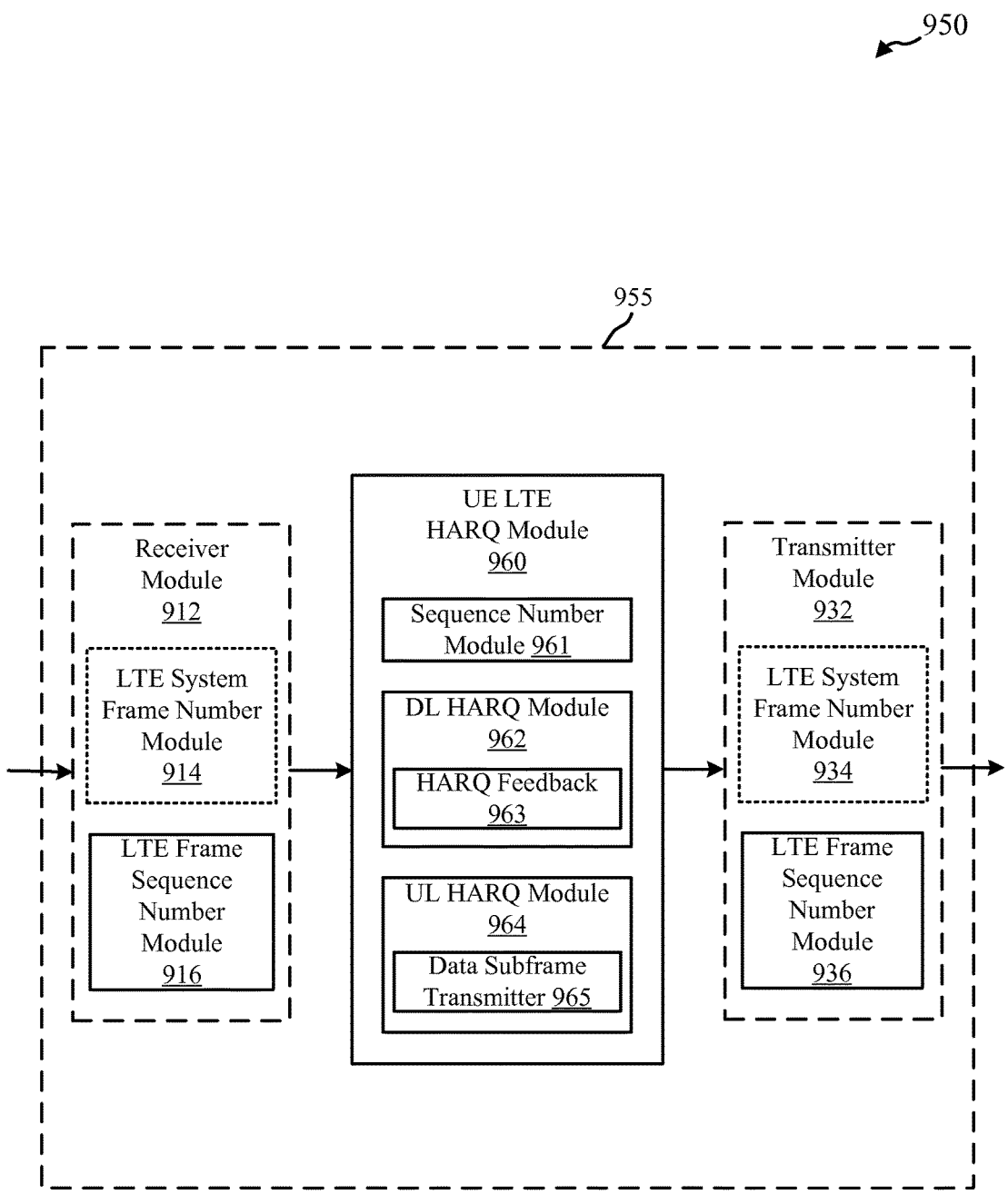

Referring now to FIG. 9B, a block diagram 950 illustrates a device 955 for use in wireless communications in accordance with various embodiments. In some examples, the device 955 may be an example of one or more aspects of the UEs 115, 215, and/or 915 described with reference to FIGS. 1, 2A, 2B, and/or 9A. The device 955 may also be a processor. The device 955 may include a receiver module 912, a UE LTE HARQ module 960, and/or a transmitter module 932. Each of these components may be in communication with each other.

The components of the device 955 may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 912 may be or include a radio frequency (RF) receiver, such as an RF receiver operable to receive transmissions in a licensed spectrum (e.g., an LTE spectrum) and/or an unlicensed spectrum. The RF receiver may include separate receivers for the licensed spectrum and the unlicensed spectrum. The separate receivers may in some cases take the form of an LTE SFN module 914 and an LTE frame sequence number module 916. The LTE SFN module 914 may be used to receive LTE frames according to the use of SFNs and the LTE frame sequence number module 916 may be used to receive LTE frames according to the use of sequence numbers. The LTE SFN module 914 may be optional (as shown by the dotted lines) when the device 955 is used for LTE operations. The receiver module 912, including the modules 914 and 916, may be used to receive various types of data and/or control signals (i.e., transmissions) over one or more communication links of a wireless communications system including the licensed and unlicensed spectrums, such as one or more communication links of the wireless communications system 100, 200, and/or 250 described with reference to FIGS. 1, 2A, and/or 2B.

In some examples, the transmitter module 932 may be or include an RF transmitter, such as an RF transmitter operable to transmit in the licensed spectrum and/or the unlicensed spectrum. The RF transmitter may include separate transmitters for the licensed spectrum and the unlicensed spectrum. The separate transmitters may in some cases take the form of an LTE SFN module 934 and an LTE frame sequence number module 936. The LTE SFN module 934 may be used to receive LTE frames according to the use of SFNs and the LTE frame sequence number module 936 may be used to receive LTE/LTE-A in an unlicensed or shared spectrum frames according to the use of sequence numbers. The LTE SFN module 934 may be optional (as shown by the dotted lines) when the device 955 is used for LTE/LTE-A in an unlicensed or shared spectrum operations. The transmitter module 932, including modules 934 and 936, may be used to transmit various types of data and/or control signals (i.e., transmissions) over one or more communication links of a wireless communications system, such as one or more communication links of the wireless communications system 100, 200, and/or 250 described with reference to FIGS. 1, 2A, and/or 2B.

The UE LTE HARQ module 960 may be an example of the UE LTE HARQ module 920 described with reference to FIG. 9A and may include a sequence number module 961, a DL HARQ module 962, and/or a UL HARQ module 964. Each of these components may be in communication with each other.

In some examples, the sequence number module 961 may receive a sequence number for each of a number of data frames received over an unlicensed spectrum. The sequence number(s) may be received over the unlicensed spectrum via the unlicensed spectrum module 916 of the receiver module 912. By way of example, the sequence numbers may be generated in numerical order or some other order known or conveyed to the device 955. When received by the device 955 in conjunction with the reception of a data frame, the sequence number corresponding to the data frame enables the sequence number module 961 to determine whether the data frame is received by the device 955 in a specified order or received out of order. When the sequence number module 961 determines that the data frame is received by the device 955 in the specified order, the device 955 may indicate this to the DL HARQ module 962 and/or the UL HARQ module 964. When the sequence number module 961 determines that the data frame is received by the device 955 out of order, the device 955 may indicate this to the DL HARQ module 962 and/or the UL HARQ module 964. An example transmission of a sequence number 425 corresponding to a data frame 405 and one or more data subframes 430, 431, 432, 433, as may be received by the sequence number module 961, is described with reference to FIG. 4. An example transmission of a sequence number 625 corresponding to a data frame 605 and HARQ feedback including uplink grants 630, 631, 632, 633 is described with reference to FIG. 6.

The DL HARQ module 962 may be used in a downlink mode of operation of the device 955 (e.g., a downlink mode between an eNB and the device 955). In such a mode, the DL HARQ module 962 may receive, from the sequence number module 961, an indication of whether a sequence number is received in a specified order or out of order. The sequence number may correspond to a data frame and one or more data subframes of the data frame.

When the sequence number corresponding to the data frame is received by the device 955 in a specified order (e.g., numerical order), a HARQ feedback module 963 of the DL HARQ module 962 may transmit HARQ feedback for the one or more data subframes. However, when the sequence number corresponding to the data frame is received by the device 955 out of order, the HARQ feedback module 963 may not transmit HARQ feedback for the one or more data subframes. When transmitted, the HARQ feedback may be transmitted over the unlicensed spectrum via the unlicensed spectrum module 936 of the transmitter module 932. An example transmission of HARQ feedback 445, 446, 447, 448, as may be made by the device 955, is described with reference to FIG. 4. An example out of order sequence number 525-a and non-transmission of HARQ feedback is described with reference to FIG. 5.

In some cases, the HARQ feedback module 963 may transmit HARQ feedback for a subset of the plurality of data subframes in the current data frame, and transmit HARQ feedback for a remaining subset of the plurality of data subframes (i.e., data subframes in the current data frame) during a next data frame.

In some cases, a separate HARQ feedback message may be transmitted for each of a plurality of data subframes in a current data frame. The HARQ feedback messages may be transmitted in the current data frame and/or a next data frame.

In some examples, HARQ feedback may be transmitted for each of the one or more data subframes in a data frame during each of a plurality of corresponding uplink subframes. Some or all of the uplink subframes may occur during the current data frame and/or during a next data frame.

The UL HARQ module 964 may be used in an uplink mode of operation of the device 555 (e.g., an uplink mode between an eNB and the device 955). In such a mode, the UL HARQ module 964 may receive, from the sequence number module 961, an indication of whether a sequence number is received in a specified order or out of order. The sequence number may correspond to a data frame and HARQ feedback of the data frame. In some cases, the HARQ feedback may include one or more uplink grants.

When the sequence number corresponding to the data frame is received by the device 955 in a specified order (e.g., numerical order), a data subframe transmitter module 965 of the UL HARQ module 964 may transmit one or more data subframes in response to the HARQ feedback. However, when the sequence number corresponding to the data frame is received by the device 955 out of order, the data subframe transmitter module 965 may not transmit any data subframes. When transmitted, the one or more data subframes may be transmitted over the unlicensed spectrum via the unlicensed spectrum module 936 of the transmitter module 932. An example transmission of one or more data subframes 645, 646, 647, 648 is described with reference to FIG. 6. An example out of order sequence number 725-a and non-transmission of one or more data subframes is described with reference to FIG. 7.

In some cases, the HARQ feedback may include one or more HARQ feedback messages, and a separate data subframe may be transmitted for each of the one or more HARQ feedback messages. Each HARQ feedback message may include a separate uplink grant.

In some cases, each of one or more data subframes may be transmitted during each of one or more corresponding uplink subframes, and each corresponding uplink subframe may occur during a current data frame.

Figure 10:
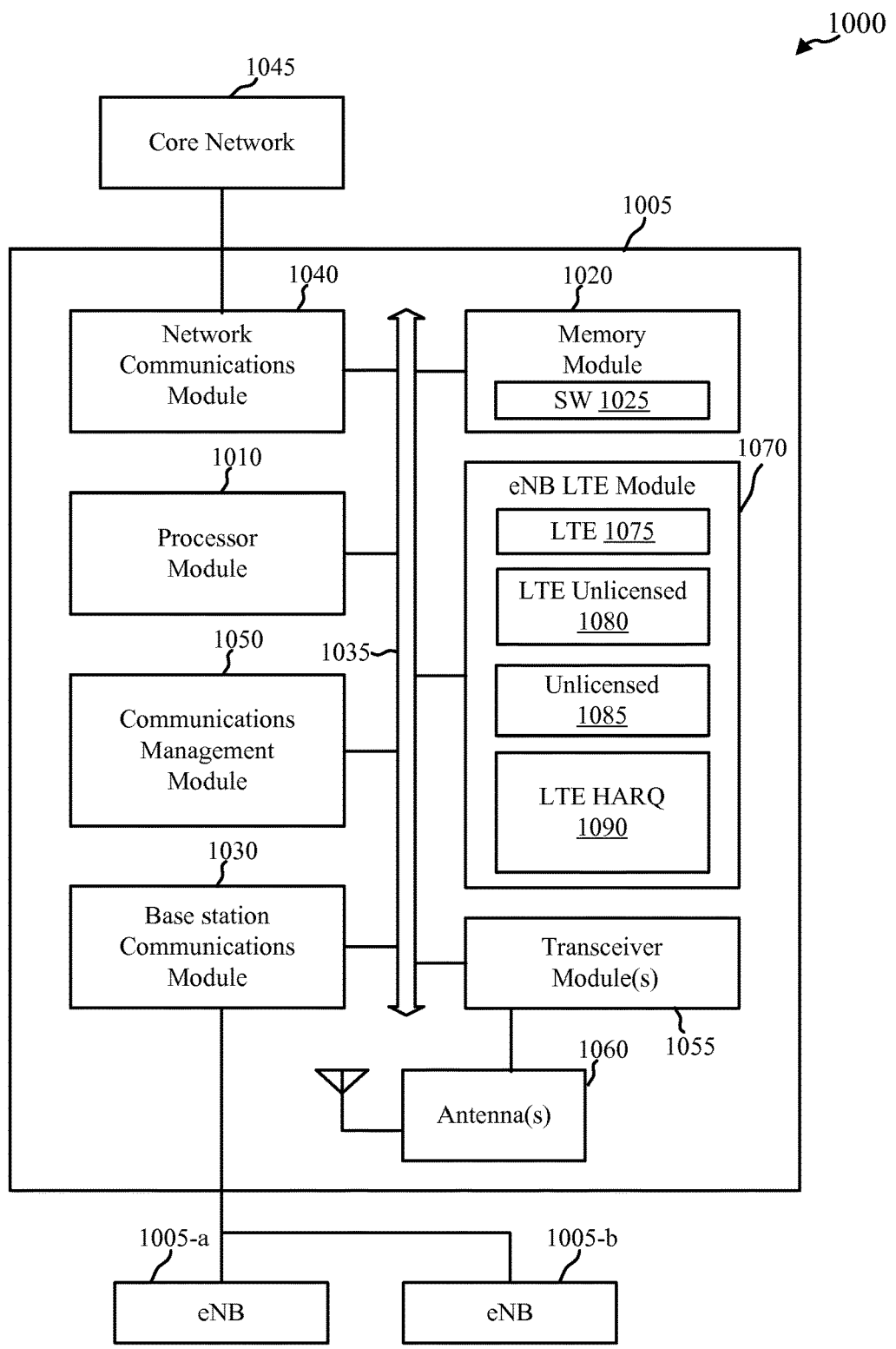
FIG. 10 shows a block diagram that illustrates an example of an eNB architecture according to various embodiments.

Turning to FIG. 10, a block diagram 1000 is shown that illustrates an eNB 1005 configured for LTE/LTE-A in an unlicensed or shared spectrum. In some examples, the eNB 1005 may be an example of one or more aspects of the eNBs or devices 105, 205, 805, and/or 855 described with reference to FIGS. 1, 2A, 2B, 8A, and/or 8B. The eNB 1005 may be configured to implement at least some of the eNB LTE features and functions described with reference to FIGS. 1, 2A, 2B, 4, 5, 6, 7, 8A, and/or 8B. The eNB 1005 may include a processor module 1010, a memory module 1020, at least one transceiver module (represented by transceiver module(s) 1055), at least one antenna (represented by antenna(s) 1060), and/or an eNB LTE module 1070. The eNB 1005 may also include one or both of a base station communications module 1030 and a network communications module 1040. Each of these components may be in communication with each other, directly or indirectly, over one or more buses 1035.

The memory module 1020 may include random access memory (RAM) and/or read-only memory (ROM). The memory module 1020 may store computer-readable, computer-executable software (SW) code 1025 containing instructions that are configured to, when executed, cause the processor module 1010 to perform various functions described herein for using LTE-based communications in a licensed and/or unlicensed spectrum, including, for example 1) the transmission of a sequence number corresponding to a data frame, over the unlicensed spectrum, to a UE, and 2) the transmission or reception of one or more data subframes and/or HARQ feedback corresponding to the sequence number and/or data frame. Alternatively, the software code 1025 may not be directly executable by the processor module 1010 but be configured to cause the eNB 1005, e.g., when compiled and executed, to perform various of the functions described herein.

The processor module 1010 may include an intelligent hardware device, e.g., a central processing unit (CPU), a microcontroller, an ASIC, etc. The processor module 1010 may process information received through the transceiver module(s) 1055, the base station communications module 1030, and/or the network communications module 1040. The processor module 1010 may also process information to be sent to the transceiver module(s) 1055 for transmission through the antenna(s) 1060, to the base station communications module 1030 for transmission to one or more other base stations or eNBs 1005-a and 1005-b, and/or to the network communications module 1040 for transmission to a core network 1045, which may be an example of aspects of the core network 130 described with reference to FIG. 1. The processor module 1010 may handle, alone or in connection with the eNB LTE module 1070, various aspects of using LTE-based communications in a licensed and/or unlicensed spectrum, including, for example 1) the transmission of a sequence number corresponding to a data frame, over the unlicensed spectrum, to a UE, and 2) the transmission or reception of one or more data subframes and/or HARQ feedback corresponding to the sequence number and/or data frame.

The transceiver module(s) 1055 may include a modem configured to modulate the packets and provide the modulated packets to the antenna(s) 1060 for transmission, and to demodulate packets received from the antenna(s) 1060. The transceiver module(s) 1055 may be implemented as one or more transmitter modules and one or more separate receiver modules. The transceiver module(s) 1055 may support communications in a licensed spectrum (e.g., an LTE spectrum) and/or an unlicensed spectrum. The transceiver module(s) 1055 may be configured to communicate bi-directionally, via the antenna(s) 1060, with one or more of the UEs or devices 115, 215, 915, and/or 955 described with reference to FIGS. 1, 2A, 2B, 9A, and/or 9B, for example. The eNB 1005 may typically include multiple antennas 1060 (e.g., an antenna array). The eNB 1005 may communicate with the core network 1045 through the network communications module 1040. The eNB 1005 may communicate with other base stations or eNBs, such as the eNBs 1005-*a* and 1005-*b*, using the base station communications module 1030.

According to the architecture of FIG. 10, the eNB 1005 may further include a communications management module 1050. The communications management module 1050 may manage communications with other base stations, eNBs, and/or devices. The communications management module 1050 may be in communication with some or all of the other components of the eNB 1005 via the bus or buses 1035. Alternatively, functionality of the communications management module 1050 may be implemented as a component of the transceiver module(s) 1055, as a computer program product, and/or as one or more controller elements of the processor module 1010.

The eNB LTE module 1070 may be configured to perform and/or control some or all of the features and/or functions described with reference to FIGS. 1, 2A, 2B, 4, 5, 6, 7, 8A, and/or 8B related to using LTE-based communications in a licensed and/or unlicensed spectrum. For example, the eNB LTE module 1070 may be configured to support a supplemental downlink mode, a carrier aggregation mode, and/or a standalone mode. The eNB LTE module 1070 may include an LTE module 1075 configured to handle LTE communications, an LTE unlicensed module 1080 configured to handle LTE/LTE-A in an unlicensed or shared spectrum communications (including the performance of CCA for an unlicensed spectrum), and/or an unlicensed module 1085 configured to handle communications other than LTE in an unlicensed spectrum. The eNB LTE module 1070 may also include an LTE HARQ module 1090 configured to perform, for example, any of the eNB LTE HARQ functions described with reference to FIGS. 1, 4, 5, 6, 7, 8A, and/or 8B. The LTE HARQ module 1090 may be an example of similar modules (e.g., module 820 and/or module 860) described with reference to FIGS. 8A and/or 8B. The eNB LTE module 1070, or portions of it, may include a processor, and/or some or all of the functionality of the eNB LTE module 1070 may be performed by the processor module 1010 and/or in connection with the processor module 1010.

Figure 11:
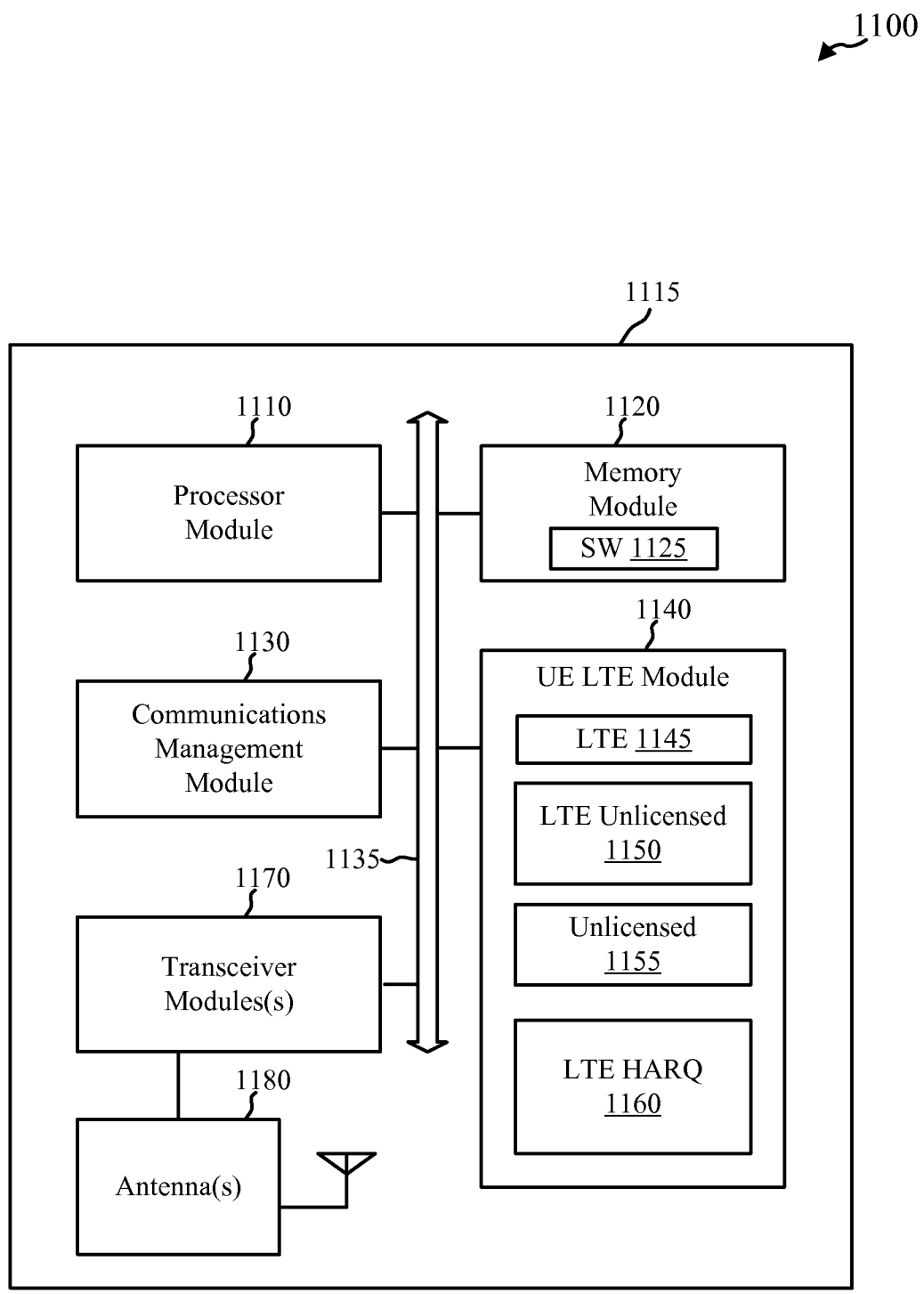
FIG. 11 shows a block diagram that illustrates an example of a UE architecture according to various embodiments.

Turning to FIG. 11, a block diagram 1100 is shown that illustrates a UE 1115 configured for LTE/LTE-A in an unlicensed or shared spectrum. The UE 1115 may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The UE 1115 may have an internal power supply (not shown), such as a small battery, to facilitate mobile operation. In some examples, the UE 1115 may be an example of one or more of the UEs or devices 115, 215, 915, and/or 955 described with reference to FIGS. 1, 2A, 2B, 9A, and/or 9B. The UE 1115 may be configured to communicate with one or more of the eNBs or devices 105, 205, 805, 855, and/or 1005 described with reference to FIGS. 1, 2A, 2B, 8A, 8B, and/or 10.

The UE 1115 may include a processor module 1110, a memory module 1120, at least one transceiver module (represented by transceiver module(s) 1170), at least one antenna (represented by antenna(s) 1180), and/or a UE LTE module 1140. Each of these components may be in communication with each other, directly or indirectly, over one or more buses 1135.

The memory module 1120 may include RAM and/or ROM. The memory module 1120 may store computer-readable, computer-executable software (SW) code 1125 containing instructions that are configured to, when executed, cause the processor module 1110 to perform various functions described herein for using LTE-based communications in a licensed and/or unlicensed spectrum, including, for example 1) the reception, over the unlicensed spectrum, of a sequence number corresponding to a data frame, and 2) the transmission or reception of one or more data subframes and/or HARQ feedback corresponding to the sequence number and/or data frame. Alternatively, the software code 1125 may not be directly executable by the processor module 1110 but be configured to cause the UE 1115 (e.g., when compiled and executed) to perform various of the UE functions described herein.

The processor module 1110 may include an intelligent hardware device, e.g., a CPU, a microcontroller, an ASIC, etc. The processor module 1110 may process information received through the transceiver module(s) 1170 and/or information to be sent to the transceiver module(s) 1170 for transmission through the antenna(s) 1180. The processor module 1110 may handle, alone or in connection with the UE LTE module 1140, various aspects of using LTE-based communications in a licensed and/or unlicensed spectrum, including, for example 1) the reception, over the unlicensed spectrum, of a sequence number corresponding to a data frame, and 2) the transmission or reception of one or more data subframes and/or HARQ feedback corresponding to the sequence number and/or data frame.

The transceiver module(s) 1170 may be configured to communicate bi-directionally with eNBs. The transceiver module(s) 1170 may be implemented as one or more transmitter modules and one or more separate receiver modules. The transceiver module(s) 1170 may support communications in at least one licensed spectrum (e.g., an LTE spectrum) and in at least one unlicensed spectrum. The transceiver module(s) 1170 may include a modem configured to modulate the packets and provide the modulated packets to the antenna(s) 1180 for transmission, and to demodulate packets received from the antenna(s) 1180. While the UE 1115 may include a single antenna, there may be examples in which the UE 1115 may include multiple antennas 1180.

According to the architecture of FIG. 11, the UE 1115 may further include a communications management module 1130. The communications management module 1130 may manage communications with various base stations or eNBs. The communications management module 1130 may be a component of the UE 1115 in communication with some or all of the other components of the UE 1115 over the one or more buses 1135. Alternatively, functionality of the communications management module 1130 may be implemented as a component of the transceiver module(s) 1170, as a computer program product, and/or as one or more controller elements of the processor module 1110.

The UE LTE module 1140 may be configured to perform and/or control some or all of the features and/or functions described with reference to FIGS. 1, 2A, 2B, 4, 5, 6, 7, 9A, and/or 9B related to using LTE-based communications in a licensed and/or unlicensed spectrum. For example, the UE LTE module 1140 may be configured to support a supplemental downlink mode, a carrier aggregation mode, and/or a standalone mode. The UE LTE module 1140 may include an LTE module 1145 configured to handle LTE communications, an LTE unlicensed module 1150 configured to handle LTE communications, and/or an unlicensed module 1155 configured to handle communications other than LTE in an unlicensed spectrum. The UE LTE module 1140 may also include an LTE HARQ module 1160 configured to perform, for example, any of the UE LTE HARQ functions described with reference to FIGS. 1, 4, 5, 6, 7, 9A, and/or 9B. The LTE HARQ module 1160 may be an example of similar modules (e.g., module 920 and/or module 960) described with reference to FIGS. 9A and/or 9B. The UE LTE module 1140, or portions of it, may include a processor, and/or some or all of the functionality of the UE LTE module 1140 may be performed by the processor module 1110 and/or in connection with the processor module 1110.

Figure 12:
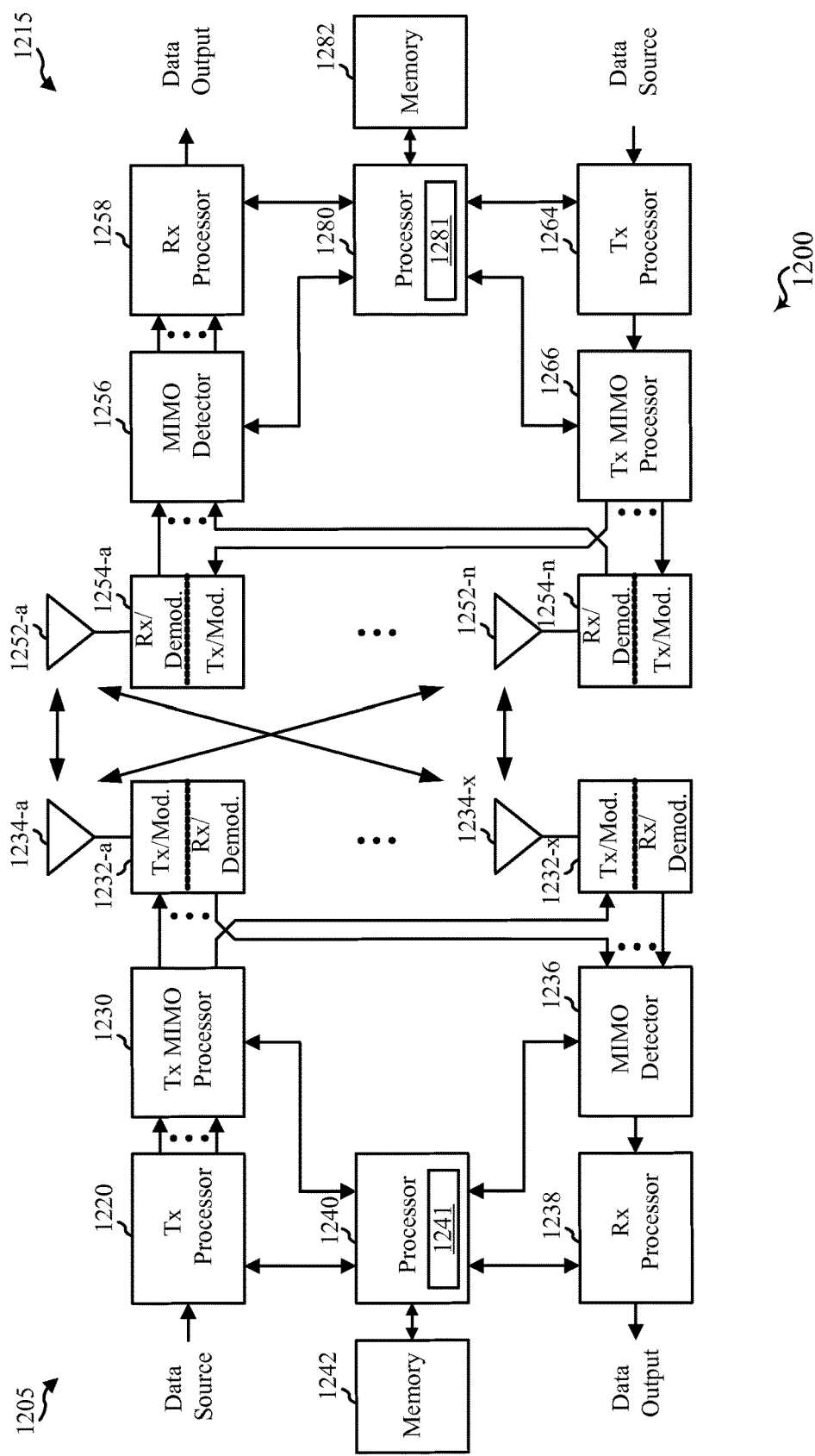
FIG. 12 shows a block diagram that illustrates an example of a multiple-input multiple-output (MIMO) communications system according to various embodiments.

Turning next to FIG. 12, a block diagram of a multiple-input multiple-output (MIMO) communication system 1200 is shown including an eNB 1205 and a UE 1215. The eNB 1205 and the UE 1215 may support LTE-based communications using a licensed and/or unlicensed spectrum. The eNB 1205 may be an example of one or more aspects of the eNBs or devices 105, 205, 805, 855, and/or 1005 described with reference to FIGS. 1, 2A, 2B, 8A, 8B, and/or 10, while the UE 1215 may be an example of one or more aspects of the UEs or devices 115, 215, 915, 955, and/or 1115 described with reference to FIGS. 1, 2A, 2B, 9A, 9B, and/or 11. The system 1200 may illustrate aspects of the wireless communications system 100, 200, and/or 250 described with reference to FIGS. 1, 2A, and/or 2B.

The eNB 1205 may be equipped with antennas 1234-*a* through 1234-*x*, and the UE 1215 may be equipped with antennas 1252-*a* through 1252-*n*. In the system 1200, the eNB 1205 may be able to send data over multiple communication links at the same time. Each communication link may be called a "layer" and the "rank" of the communication link may indicate the number of layers used for communication. For example, in a 2×2 MIMO system where eNB 1205 transmits two "layers," the rank of the communication link between the eNB 1205 and the UE 1215 may be two.

At the eNB 1205, a transmit (Tx) processor 1220 may receive data from a data source. The transmit processor 1220 may process the data. The transmit processor 1220 may also generate reference symbols and/or a cell-specific reference signal. A transmit (Tx) MIMO processor 1230 may perform spatial processing (e.g., precoding) on data symbols, control symbols, and/or reference symbols, if applicable, and may provide output symbol streams to the transmit (Tx) modulators/demodulator 1232-*a* through 1232-*x*. Each modulator/demodulator 1232 may process a respective output symbol stream (e.g., for OFDM, etc.) to obtain an output sample stream. Each modulator/demodulator 1232 may further process (e.g., convert to analog, amplify, filter, and upconvert) the output sample stream to obtain a downlink (DL) signal. In one example, DL signals from modulator/demodulator 1232-*a* through 1232-*x* may be transmitted via the antennas 1234-*a* through 1234-*x*, respectively.

At the UE 1215, the antennas 1252-*a* through 1252-*n* may receive the DL signals from the eNB 1205 and may provide the received signals to the receive (Rx) modulator/demodulators 1254-*a* through 1254-*n*, respectively. Each modulator/demodulator 1254 may condition (e.g., filter, amplify, downconvert, and digitize) a respective received signal to obtain input samples. Each modulator/demodulator 1254 may further process the input samples (e.g., for OFDM, etc.) to obtain received symbols. A MIMO detector 1256 may obtain received symbols from all the modulator/demodulators 1254-*a* through 1254-*n*, perform MIMO detection on the received symbols if applicable, and provide detected symbols. A receive (Rx) processor 1258 may process (e.g., demodulate, deinterleave, and decode) the detected symbols, providing decoded data for the UE 1215 to a data output, and provide decoded control information to a processor 1280, or memory 1282. The processor 1280 may include a module or function 1281 that may perform various functions related to using LTE-based communications in a licensed and/or unlicensed spectrum. For example, the module or function 1281 may perform some or all of the functions of the LTE HARQ module 920, 960, and/or 1160 described with reference to FIGS. 9A, 9B, and/or 11, and/or the UE LTE module 1140 described with reference to FIG. 11.

On the uplink (UL), at the UE 1215, a transmit (Tx) processor 1264 may receive and process data from a data source. The transmit processor 1264 may also generate reference symbols for a reference signal. The symbols from the transmit processor 1264 may be precoded by a transmit (Tx) MIMO processor 1266 if applicable, further processed by the transmit (Tx) modulator/demodulators 1254-*a* through 1254-*n* (e.g., for SC-FDMA, etc.), and be transmitted to the eNB 1205 in accordance with the transmission parameters received from the eNB 1205. At the eNB 1205, the UL signals from the UE 1215 may be received by the antennas 1234, processed by the receiver (Rx) modulator/demodulators 1232, detected by a MIMO detector 1236 if applicable, and further processed by a receive (Rx) processor 1238. The receive processor 1238 may provide decoded data to a data output and to the processor 1240. The processor 1240 may include a module or function 1241 that may perform various aspects related to using LTE-based communications in a licensed and/or unlicensed spectrum. For example, the module or function 1241 may perform some or all of the functions of the LTE HARQ module 820, 860, and/or 1090 described with reference to FIGS. 8A, 8B, and/or 10, the CCA module 861 described with reference to FIG. 8B, and/or the eNB LTE module 1070 described with reference to FIG. 10.

The components of the eNB 1205 may, individually or collectively, be implemented with one or more ASICs adapted to perform some or all of the applicable functions in hardware. Each of the noted modules may be a means for performing one or more functions related to operation of the system 1200. Similarly, the components of the UE 1215 may, individually or collectively, be implemented with one or more ASICs adapted to perform some or all of the applicable functions in hardware. Each of the noted components may be a means for performing one or more functions related to operation of the system 1200.

Figure 13:
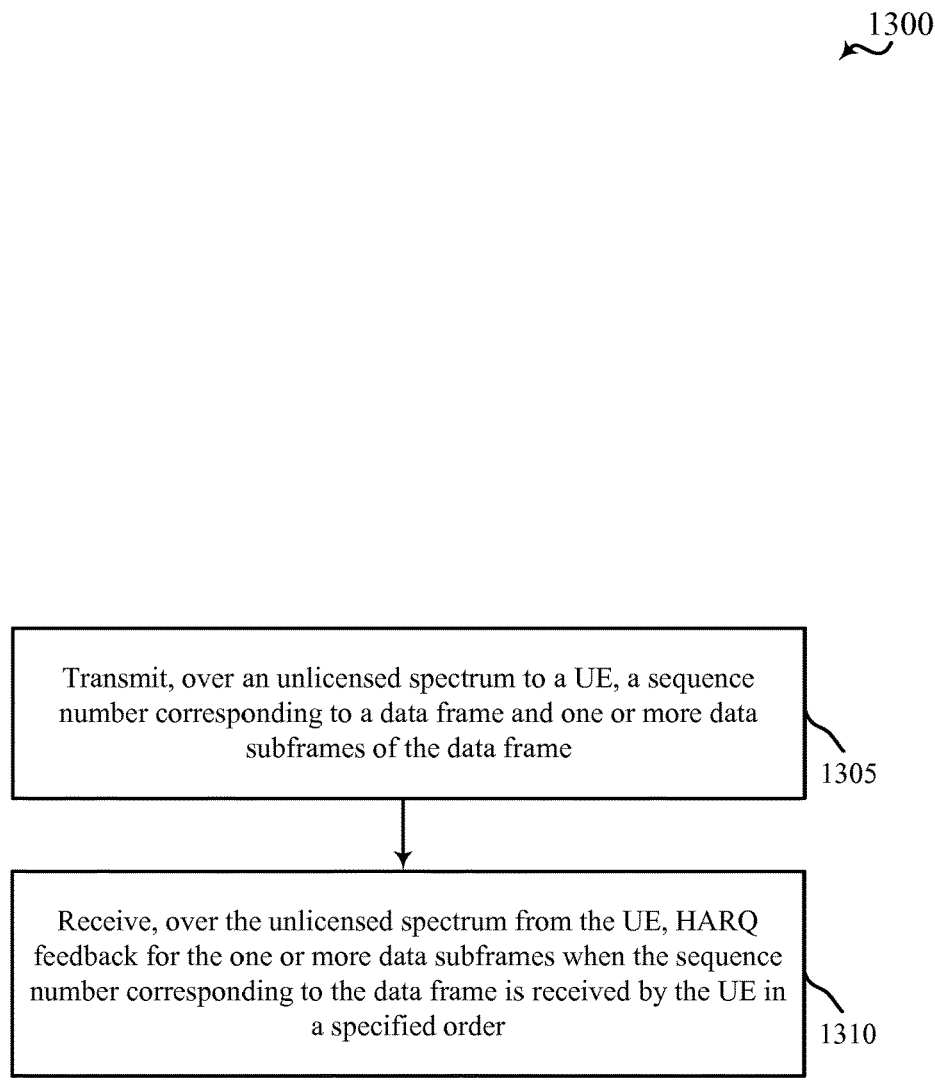
FIGS. 13 and 14 are flowcharts of examples of methods for wireless communications using unlicensed spectrum in a downlink mode of operation (e.g., from an eNB perspective) according to various embodiments.

FIG. 13 is a flow chart illustrating an example of a method 1300 for wireless communications. For clarity, the method 1300 is described below with reference to one of the eNBs or devices 105, 205, 805, 855, 1005, and/or 1205 described with reference to FIGS. 1, 2A, 2B, 8A, 8B, 10, and/or 12 and one of the UEs or devices 115, 215, 915, 955, 1115, and/or 1215 described with reference to FIGS. 1, 2A, 2B, 9A, 9B, 10, and/or 12. In one examples, an eNB may execute one or more sets of codes to control the functional elements of the eNB to perform the functions described below.

At block 1305, a sequence number corresponding to a data frame and one or more data subframes of the data frame may be transmitted over an unlicensed spectrum to a UE. An example transmission of a sequence number 425 corresponding to a data frame 405 and one or more data subframes 430, 431, 432, 433 is described with reference to FIG. 4. The operation(s) at block 1305 may in some cases be performed using the eNB LTE HARQ module 820, 860, and/or 1090 described with reference to FIGS. 8A, 8B, and/or 10, the sequence number module 863 and/or DL HARQ module 864 described with reference to FIG. 8B, and/or the module or function 1241 described with reference to FIG. 12.

At block 1310, HARQ feedback for the one or more data subframes may be received over the unlicensed spectrum, from the UE, when the sequence number corresponding to the data frame is received by the UE in a specified order (e.g., numerical order). An example transmission of HARQ feedback 445, 446, 447, 448 is described with reference to FIG. 4.

In some cases, a separate HARQ feedback message may be received for each of the one or more data subframes. In some cases, HARQ feedback may be received for each of the one or more data subframes during each of one or more corresponding uplink subframes, and each corresponding uplink subframe may occur during the data frame or during a next data frame.

The operation(s) at block 1310 may in some cases be performed using the eNB LTE HARQ module 820, 860, and/or 1090 described with reference to FIGS. 8A, 8B, and/or 10, the HARQ feedback module 865 described with reference to FIG. 8B, and/or the module or function 1241 described with reference to FIG. 12.

In some examples of the method 1300, the method 1300 may continue with the transmission over the unlicensed spectrum, to the UE, of a sequence number corresponding to a subsequent data frame and one or more data subframes of the subsequent data frame. HARQ feedback for the one or more data subframes of the subsequent data frame may then be received over the unlicensed spectrum, from the UE, when the sequence number for the subsequent data frame is received by the UE in the specified order. An example transmission of a sequence number 425-*a* corresponding to a subsequent data subframe 405-*a* and one or more data subframes 430-*a*, 431-*a*, 432-*a*, 433-*a* of the subsequent data frame is described with reference to FIG. 4. An example transmission of HARQ feedback 445-*a*, 446-*a*, 447-*a*, 448-*a* is also described with reference to FIG. 4.

In some examples of the method 1300, HARQ feedback may not be transmitted by the UE for the one or more data subframes when the sequence number corresponding to the data frame is received by the UE out of order. An example out of order sequence number 525-*a* and non-transmission of HARQ feedback is described with reference to FIG. 5.

In some examples, CCA may be performed to determine availability of the unlicensed spectrum, and the unlicensed spectrum may be accessed during the data frame (e.g., for transmitting the sequence number and/or data subframes at block 1305) when a determination is made that the unlicensed spectrum is available. Another CCA may be performed to determine availability of the unlicensed spectrum during the next data frame, and so on.

Thus, the method 1300 may provide for wireless communications. It should be noted that the method 1300 is just one implementation and that the operations of the method 1300 may be rearranged or otherwise modified such that other implementations are possible.

Figure 14:
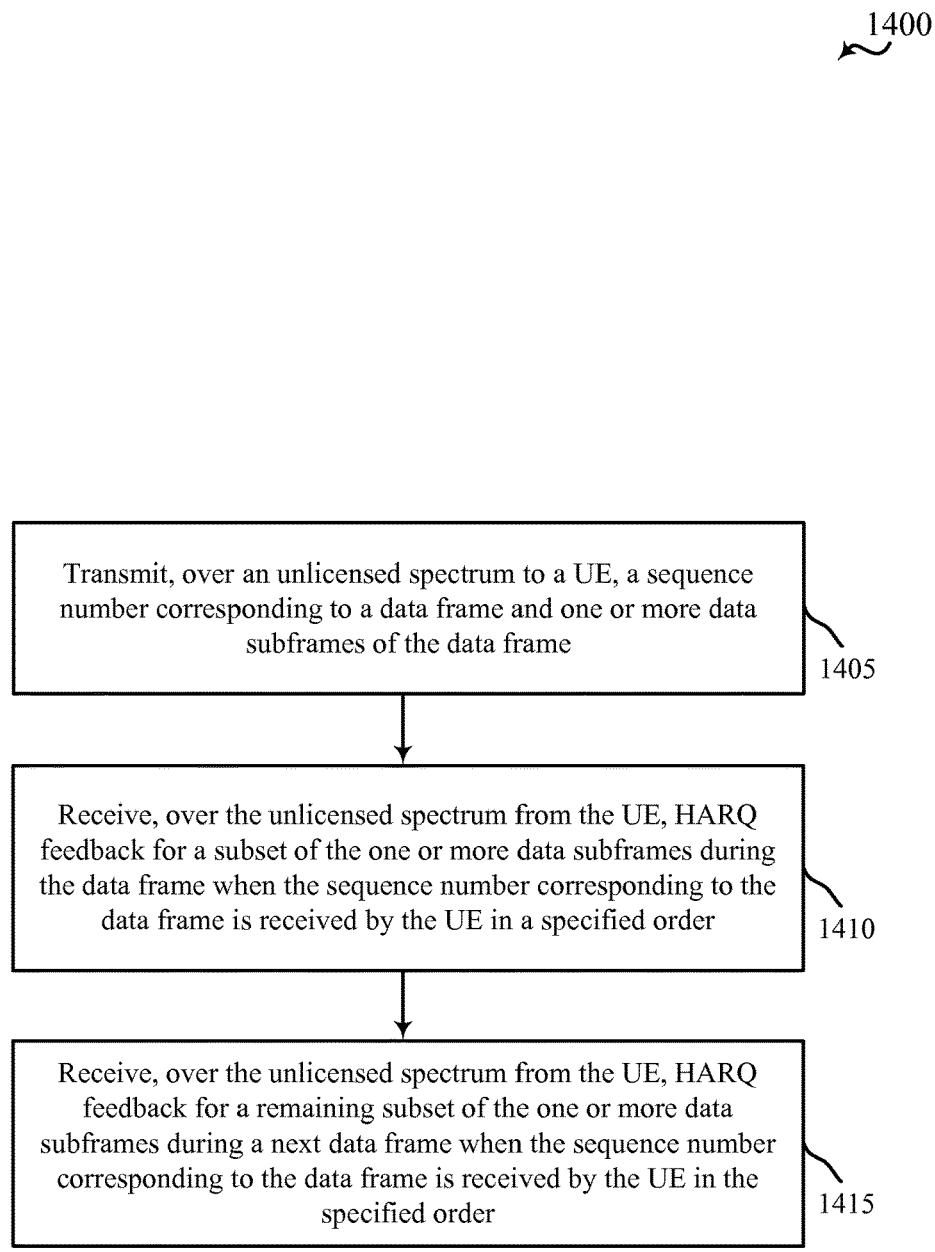

FIG. 14 is a flow chart illustrating an example of a method 1400 for wireless communications. For clarity, the method 1400 is described below with reference to one of the eNBs or devices 105, 205, 805, 855, 1005, and/or 1205 described with reference to FIGS. 1, 2A, 2B, 8A, 8B, 10, and/or 12 and one of the UEs or devices 115, 215, 915, 955, 1115, and/or 1215 described with reference to FIGS. 1, 2A, 2B, 9A, 9B, 10, and/or 12. In one example, an eNB may execute one or more sets of codes to control the functional elements of the eNB to perform the functions described below.

At block 1405, a sequence number corresponding to a data frame and a plurality of data subframes of the data frame may be transmitted over an unlicensed spectrum to a UE. An example transmission of a sequence number 425 corresponding to a data frame 405 and a plurality of data subframes 430, 431, 432, 433 is described with reference to FIG. 4. The operation(s) at block 1405 may in some cases be performed using the eNB LTE HARQ module 820, 860, and/or 1090 described with reference to FIGS. 8A, 8B, and/or 10, the sequence number module 863 and/or DL HARQ module 864 described with reference to FIG. 8B, and/or the module or function 1241 described with reference to FIG. 12.

At block 1410 and/or 1415, HARQ feedback for the plurality of data subframes may be received over the unlicensed spectrum, from the UE, when the sequence number corresponding to the data frame is received by the UE in a specified order (e.g., numerical order). At block 1410, and during the data frame, HARQ feedback may be received for a subset of the plurality of data subframes (e.g., for one or more of the data subframes). At block 1415, and during a next data frame, HARQ feedback may be received for a remaining subset of the plurality of data subframes (e.g., for a remaining one or more of the data subframes). An example transmission of HARQ feedback 445, 446, 447, 448 is described with reference to FIG. 4.

In some cases, a separate HARQ feedback message may be received for each of the plurality of data subframes, with at least one of the HARQ feedback messages being received during the data frame and at least one of the HARQ feedback messages being received during the next data frame. In some cases, HARQ feedback may be received for each of the plurality of data subframes during each of a plurality of corresponding uplink subframes, with at least one of the corresponding uplink subframes occurring during the data frame and at least one of the corresponding uplink subframes occurring during a next data frame.

The operation(s) at block 1410 may in some cases be performed using the eNB LTE HARQ module 820, 860, and/or 1090 described with reference to FIGS. 8A, 8B, and/or 10, the HARQ feedback module 865 described with reference to FIG. 8B, and/or the module or function 1241 described with reference to FIG. 12.

In some examples of the method 1400, the method 1400 may continue with the transmission over the unlicensed spectrum, to the UE, of a sequence number corresponding to a subsequent data frame and one or more data subframes of the subsequent data frame. HARQ feedback for the one or more data subframes of the subsequent data frame may then be received over the unlicensed spectrum, from the UE, when the sequence number for the subsequent data frame is received by the UE in the specified order. An example transmission of a sequence number 425-*a* corresponding to a subsequent data subframe 405-*a* and one or more data subframes 430-*a*, 431-*a*, 432-*a*, 433-*a* of the subsequent data frame is described with reference to FIG. 4. An example transmission of HARQ feedback 445-*a*, 446-*a*, 447-*a*, 448-*a* is also described with reference to FIG. 4.

In some examples of the method 1400, HARQ feedback may not be transmitted by the UE for the one or more data subframes when the sequence number corresponding to the data frame is received by the UE out of order. An example out of order sequence number 525-*a* and non-transmission of HARQ feedback is described with reference to FIG. 5.

In some examples, CCA may be performed to determine availability of the unlicensed spectrum, and the unlicensed spectrum may be accessed during the data frame (e.g., for transmitting the sequence number and/or data subframes at block 1305) when a determination is made that the unlicensed spectrum is available. Another CCA may be performed to determine availability of the unlicensed spectrum during the next data frame, and so on.

Thus, the method 1400 may provide for wireless communications. It should be noted that the method 1400 is just one implementation and that the operations of the method 1400 may be rearranged or otherwise modified such that other implementations are possible.

Figure 15:
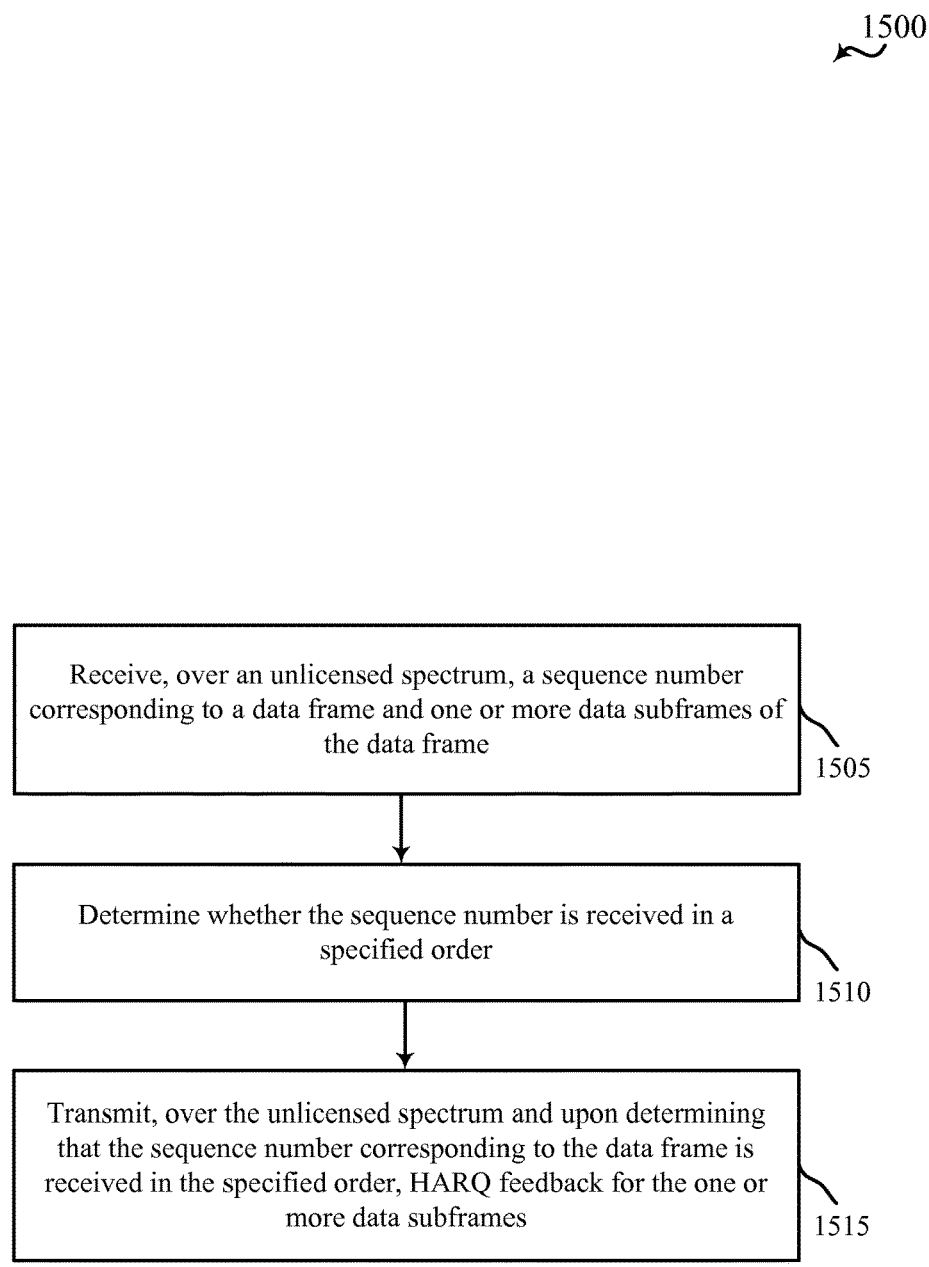
FIG. 15 is a flowchart of an example of a method for wireless communications using unlicensed spectrum in a downlink mode of operation (e.g., from a UE perspective) according to various embodiments.

FIG. 15 is a flow chart illustrating an example of a method 1500 for wireless communications. For clarity, the method 1500 is described below with reference to one of the UEs or devices 115, 215, 915, 955, 1115, and/or 1215 described with reference to FIGS. 1, 2A, 2B, 9A, 9B, 10, and/or 12 and one of the eNBs or devices 105, 205, 805, 855, 1005, and/or 1205 described with reference to FIGS. 1, 2A, 2B, 8A, 8B, 10, and/or 12. In one examples, a UE may execute one or more sets of codes to control the functional elements of the UE to perform the functions described below.

At block 1505, a sequence number corresponding to a data frame and one or more data subframes of the data frame may be received over an unlicensed spectrum. In some cases, the sequence number may be received at a UE from an eNB. An example transmission of a sequence number 425 corresponding to a data frame 405 and one or more data subframes 430, 431, 432, 433 is described with reference to FIG. 4.

At block 1510, it may be determined whether the sequence number is received in a specified order (e.g., numerical order) by the UE.

The operation(s) at block 1505 and/or block 1510 may in some cases be performed using the UE LTE HARQ module 920, 960, and/or 1160 described with reference to FIGS. 9A, 9B, and/or 11, the sequence number module 961 and/or DL HARQ module 962 described with reference to FIG. 9B, and/or the module or function 1281 described with reference to FIG. 12.

At block 1515, and upon determining at block 1510 that the sequence number corresponding to the data frame is received in the specified order, HARQ feedback for the one or more data subframes may be transmitted over the unlicensed spectrum (e.g., from the UE to the eNB). An example transmission of HARQ feedback 445, 446, 447, 448 is described with reference to FIG. 4.

In some cases, a separate HARQ feedback message may be transmitted for each of the one or more data subframes. In some cases, HARQ feedback may be transmitted for each of the one or more data subframes during each of one or more corresponding uplink subframes, and each corresponding uplink subframe may occur during the data frame or during a next data frame.

The operation(s) at block 1515 may in some cases be performed using the UE LTE HARQ module 920, 960, and/or 1160 described with reference to FIGS. 9A, 9B, and/or 11, the HARQ feedback module 963 described with reference to FIG. 9B, and/or the module or function 1281 described with reference to FIG. 12.

In some examples of the method 1500, the method 1500 may continue with the reception over the unlicensed spectrum of a sequence number corresponding to a subsequent data frame and one or more data subframes of the subsequent data frame. It may then be determined whether the sequence number corresponding to the subsequent data frame is received by the UE in the specified order. Upon determining that the sequence number for the subsequent data frame is received in the specified order, HARQ feedback for the one or more data subframes of the subsequent data frame may be transmitted over the unlicensed spectrum. An example transmission of a sequence number 425-*a* corresponding to a subsequent data subframe 405-*a* and one or more data subframes 430-*a*, 431-*a*, 432-*a*, 433-*a* of the subsequent data frame is described with reference to FIG. 4. An example transmission of HARQ feedback 445-*a*, 446-*a*, 447-*a*, 448-*a* is also described with reference to FIG. 4.

In some examples of the method 1500, it may be determined not to transmit HARQ feedback for the one or more data subframes upon determining that the sequence number corresponding to the data frame is received out of order. It may also be determined to discard the one or more data subframes upon determining that the sequence number corresponding to the data frame is received out of order. An example out of order sequence number 525-*a* and non-transmission of HARQ feedback is described with reference to FIG. 5.

In some examples of the method 1500, transmitting HARQ feedback for the one or more data subframes may include 1) transmitting HARQ feedback for a subset of the one or more data subframes during the data frame, and 2) transmitting HARQ feedback for a remaining subset of the one or more data subframes during a next data frame.

Thus, the method 1500 may provide for wireless communications. It should be noted that the method 1500 is just one implementation and that the operations of the method 1500 may be rearranged or otherwise modified such that other implementations are possible.

Figure 16:
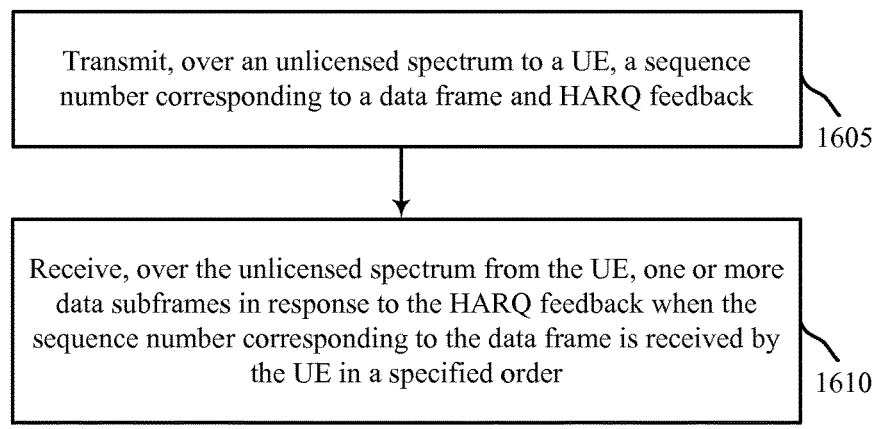
FIG. 16 is a flowchart of an example of a method for wireless communications using unlicensed spectrum in an uplink mode of operation (e.g., from an eNB perspective) according to various embodiments.

FIG. 16 is a flow chart illustrating an example of a method 1600 for wireless communications. For clarity, the method 1600 is described below with reference to one of the eNBs or devices 105, 205, 805, 855, 1005, and/or 1205 described with reference to FIGS. 1, 2A, 2B, 8A, 8B, 10, and/or 12 and one of the UEs or devices 115, 215, 915, 955, 1115, and/or 1215 described with reference to FIGS. 1, 2A, 2B, 9A, 9B, 10, and/or 12. In one example, an eNB may execute one or more sets of codes to control the functional elements of the eNB to perform the functions described below.

At block 1605, a sequence number corresponding to a data frame and HARQ feedback may be transmitted over an unlicensed spectrum to a UE. In some cases, the HARQ feedback may include one or more uplink grants. An example transmission of a sequence number 625 corresponding to a data frame 605 and HARQ feedback including uplink grants 630, 631, 632, 633 is described with reference to FIG. 6. The operation(s) at block 1605 may in some cases be performed using the eNB LTE HARQ module 820, 860, and/or 1090 described with reference to FIGS. 8A, 8B, and/or 10, the sequence number module 863 and/or UL HARQ module 866 described with reference to FIG. 8B, and/or the module or function 1241 described with reference to FIG. 12.

At block 1610, one or more data subframes may be received from the UE over the unlicensed spectrum, in response to the HARQ feedback, when the sequence number corresponding to the data frame is received by the UE in a specified order (e.g., numerical order). An example transmission of one or more data subframes 645, 646, 647, 648 is described with reference to FIG. 6.

In some cases, the HARQ feedback may include one or more HARQ feedback messages, and a separate data subframe may be received for each of the one or more HARQ feedback messages. Each HARQ feedback message may include a separate uplink grant. In some cases, each of one or more data subframes may be received during each of one or more corresponding uplink subframes, and each corresponding uplink subframe may occur during the data frame.

The operation(s) at block 1610 may in some cases be performed using the eNB LTE HARQ module 820, 860, and/or 1090 described with reference to FIGS. 8A, 8B, and/or 10, the data subframe receiver module 867 described with reference to FIG. 8B, and/or the module or function 1241 described with reference to FIG. 12.

In some examples of the method 1600, the method 1600 may continue with the transmission over the unlicensed spectrum, to the UE, of a sequence number corresponding to a subsequent data frame and subsequent HARQ feedback. One or more additional subframes may then be received from the UE over the unlicensed spectrum, in response to receiving the subsequent HARQ feedback, when the sequence number for the subsequent data frame is received by the UE in the specified order. An example transmission of a sequence number 625-*a* corresponding to a subsequent data subframe 605-*a* and HARQ feedback 630-*a*, 631-*a*, 632-*a*, 633-*a* of the subsequent data frame is described with reference to FIG. 6. An example transmission of one or more additional data subframes 645-*a*, 646-*a*, 647-*a*, 648-*a* in response to receiving the HARQ feedback of the subsequent data frame is also described with reference to FIG. 6.

In some examples of the method 1600, the one or more data subframes may not be transmitted by the UE when the sequence number corresponding to the data frame is received by the UE out of order. An example out of order sequence number 725-*a* and non-transmission of one or more data subframes is described with reference to FIG. 7.

In some examples, CCA may be performed to determine availability of the unlicensed spectrum, and the unlicensed spectrum may be accessed during the data frame (e.g., for transmitting the sequence number and/or HARQ feedback at block 1705) when a determination is made that the unlicensed spectrum is available. Another CCA may be performed to determine availability of the unlicensed spectrum during the next data frame, and so on.

Thus, the method 1600 may provide for wireless communications. It should be noted that the method 1600 is just one implementation and that the operations of the method 1600 may be rearranged or otherwise modified such that other implementations are possible.

Figure 17:
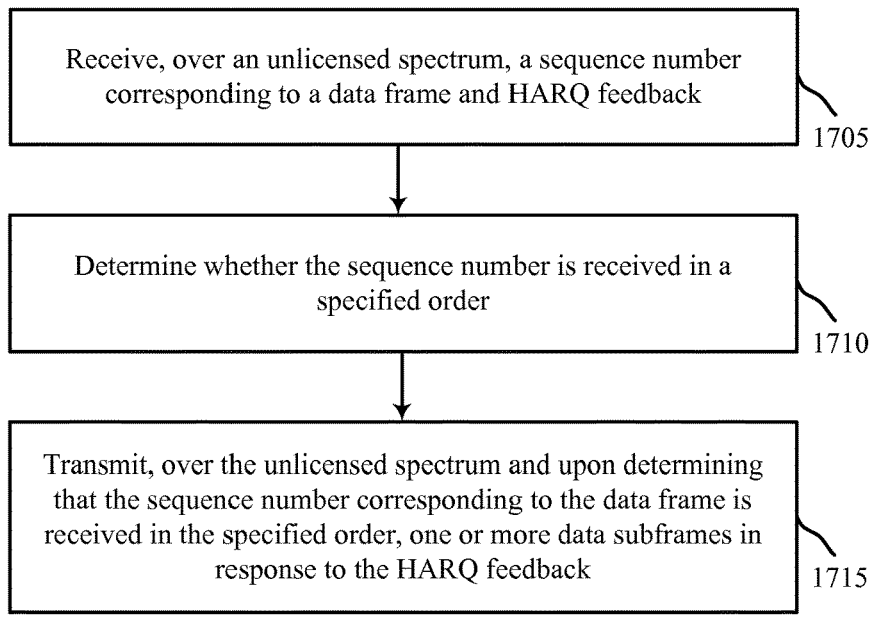
FIG. 17 is a flowchart of an example of a method for wireless communications using unlicensed spectrum in an uplink mode of operation (e.g., from a UE perspective).

FIG. 17 is a flow chart illustrating an example of a method 1700 for wireless communications. For clarity, the method 1700 is described below with reference to one of the UEs or devices 115, 215, 915, 955, 1115, and/or 1215 described with reference to FIGS. 1, 2A, 2B, 9A, 9B, 10, and/or 12 and one of the eNBs or devices 105, 205, 805, 855, 1005, and/or 1205 described with reference to FIGS. 1, 2A, 2B, 8A, 8B, 10, and/or 12. In one example, a UE may execute one or more sets of codes to control the functional elements of the UE to perform the functions described below.

At block 1705, a sequence number corresponding to a data frame and HARQ feedback may be received over an unlicensed spectrum. In some cases, the sequence number may be received at a UE from an eNB. In some cases, the HARQ feedback may include one or more uplink grants. An example transmission of a sequence number 425 corresponding to a data frame 605 and HARQ feedback including uplink grants 630, 631, 632, 633 is described with reference to FIG. 6. T At block 1710, it may be determined whether the sequence number is received in a specified order (e.g., numerical order) by the UE.

The operation(s) at block 1705 and/or block 1710 may in some cases be performed using the UE LTE HARQ module 920, 960, and/or 1160 described with reference to FIGS. 9A, 9B, and/or 11, the sequence number module 961 and/or UL HARQ module 964 described with reference to FIG. 9B, and/or the module or function 1281 described with reference to FIG. 12.

At block 1715, and upon determining at block 1710 that the sequence number corresponding to the data frame is received in the specified order, one or more data subframes may be transmitted over the unlicensed spectrum (e.g., from the UE to the eNB) in response to receiving the HARQ feedback. An example transmission of one or more data subframes 645, 646, 647, 648 is described with reference to FIG. 6.

In some cases, the HARQ feedback may include one or more HARQ feedback messages, and a separate data subframe may be transmitted for each of the one or more HARQ feedback messages. Each HARQ feedback message may include a separate uplink grant. In some cases, each of one or more data subframes may be transmitted during each of one or more corresponding uplink subframes, and each corresponding uplink subframe may occur during the data frame.

The operation(s) at block 1715 may in some cases be performed using the UE LTE HARQ module 920, 960, and/or 1160 described with reference to FIGS. 9A, 9B, and/or 11, the data subframe transmitter module 965 described with reference to FIG. 9B, and/or the module or function 1281 described with reference to FIG. 12.

In some examples of the method 1700, the method 1700 may continue with the reception over the unlicensed spectrum of a sequence number corresponding to a subsequent data frame and subsequent HARQ feedback. It may then be determined whether the sequence number corresponding to the subsequent data frame is received by the UE in the specified order. Upon determining that the sequence number for the subsequent data frame is received in the specified order, one or more additional data subframes of the subsequent data frame may be transmitted over the unlicensed spectrum, in response to receiving the subsequent HARQ feedback. An example transmission of a sequence number 625-*a* corresponding to a subsequent data subframe 605-*a* and HARQ feedback 630-*a*, 631-*a*, 632-*a*, 633-*a* of the subsequent data frame is described with reference to FIG. 6. An example transmission of one or more additional data subframes 645-*a*, 646-*a*, 647-*a*, 648-*a* in response to receiving the HARQ feedback of the subsequent data frame is also described with reference to FIG. 6.

In some examples of the method 1700, the one or more data subframes may not be transmitted when the sequence number corresponding to the data frame is received out of order. An example out of order sequence number 725-*a* and non-transmission of one or more data subframes is described with reference to FIG. 7.

Thus, the method 1700 may provide for wireless communications. It should be noted that the method 1700 is just one implementation and that the operations of the method 1700 may be rearranged or otherwise modified such that other implementations are possible.

The detailed description set forth above in connection with the appended drawings describes exemplary examples and does not represent the only example that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. A processor may in some cases be in electronic communication with a memory, where the memory stores instructions that are executable by the processor.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

A computer program product or computer-readable medium both include a computer-readable storage medium and communication medium, including any mediums that facilitates transfer of a computer program from one place to another. A storage medium may be any medium that can be accessed by a general purpose or special purpose computer. By way of example, and not limitation, computer-readable medium can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications, comprising:
   transmitting, over an unlicensed spectrum to a user equipment (UE), a sequence number corresponding to a radio frame, wherein the sequence number is transmitted in a numerical order;
   transmitting, over the unlicensed spectrum to the UE, one or more subframes of the radio frame; and
   determining whether hybrid automatic repeat request (HARQ) feedback for the one or more subframes of the radio frame is received over the unlicensed spectrum from the UE, wherein, if the HARQ feedback for the one or more subframes of the radio frame is received, then the HARQ feedback for the one or more subframes of the radio frame indicates that the sequence number corresponding to the radio frame was received by the UE in the numerical order.

2. The method of claim 1, further comprising:
   transmitting, over the unlicensed spectrum to the UE, a subsequent sequence number corresponding to a subsequent radio frame, wherein the subsequent sequence number is transmitted in the numerical order;
   transmitting, over the unlicensed spectrum to the UE, one or more subframes of the subsequent radio frame; and
   determining whether subsequent HARQ feedback for the one or more subframes of the subsequent radio frame is received over the unlicensed spectrum from the UE, wherein, if the subsequent HARQ feedback for the one or more subframes of the subsequent radio frame is received, then the subsequent HARQ feedback for the one or more subframes of the subsequent radio frame indicates that the subsequent sequence number corresponding to the subsequent radio frame was received by the UE in the numerical order.

3. The method of claim 1, wherein receiving the HARQ feedback for the one or more subframes of the radio frame comprises:
   receiving a separate HARQ feedback message for each of the one or more subframes of the radio frame.

4. The method of claim 1, wherein receiving the HARQ feedback for the one or more subframes of the radio frame comprises:

receiving HARQ feedback for a subset of the one or more subframes of the radio frame during the radio frame; and receiving HARQ feedback for a remaining subset of the one or more subframes of the radio frame during a next radio frame.

5. The method of claim 1, wherein receiving the HARQ feedback for the one or more subframes of the radio frame comprises:

receiving HARQ feedback for each of the one or more subframes of the radio frame during each of one or more corresponding uplink subframes, wherein each corresponding uplink subframe occurs during the radio frame or during a next radio frame.

6. The method of claim 1, further comprising:

performing clear channel assessment (CCA) to determine whether the unlicensed spectrum is available; and accessing the unlicensed spectrum during the radio frame when the unlicensed spectrum is determined to be available.

7. The method of claim 1, further comprising:

transmitting a request to send (RTS) signal to request channel access over the unlicensed spectrum; and receiving, in response to the RTS signal, a clear to send (CTS) signal when the unlicensed spectrum is available.

8. The method of claim 1, further comprising:

transmitting a clear to send (CTS) signal when the unlicensed spectrum is available for transmission.

9. An apparatus for wireless communications, comprising:

a processor;

memory in electronic communication with the processor; and instructions stored in the memory and executable by the processor to:

transmit, over an unlicensed spectrum to a user equipment (UE), a sequence number corresponding to a radio frame, wherein the sequence number is transmitted in a numerical order;

transmit, over the unlicensed spectrum to the UE, one or more subframes of the radio frame; and determine whether hybrid automatic repeat request (HARQ) feedback for the one or more subframes of the radio frame is received over the unlicensed spectrum from the UE, wherein, if the HARQ feedback for the one or more subframes of the radio frame is received, then the HARQ feedback for the one or more subframes of the radio frame indicates that the sequence number corresponding to the radio frame was received by the UE in the numerical order.

10. The apparatus of claim 9, wherein the instructions are executable by the processor to:

transmit, over the unlicensed spectrum to the UE, a subsequent sequence number corresponding to a subsequent radio frame, wherein the subsequent sequence number is transmitted in the numerical order;

transmit, over the unlicensed spectrum to the UE, one or more subframes of the subsequent radio frame; and determine whether subsequent HARQ feedback for the one or more subframes of the subsequent radio frame is received over the unlicensed spectrum from the UE, wherein, if the subsequent HARQ feedback for the one or more subframes of the subsequent radio frame is received, then the subsequent HARQ feedback for the one or more subframes of the subsequent radio frame indicates that the subsequent sequence number corresponding to the subsequent radio frame was received by the UE in the numerical order.

11. The apparatus of claim 9, wherein the instructions to receive the HARQ feedback for the one or more subframes of the radio frame are executable by the processor to:

receive a separate HARQ feedback message for each of the one or more subframes of the radio frame.

12. The apparatus of claim 9, wherein the instructions to receive the HARQ feedback for the one or more subframes of the radio frame are executable by the processor to:

receive HARQ feedback for a subset of the one or more subframes of the radio frame during the radio frame; and receive HARQ feedback for a remaining subset of the one or more subframes of the radio frame during a next radio frame.

13. The apparatus of claim 9, wherein the instructions to receive the HARQ feedback for the one or more subframes of the radio frame are executable by the processor to:

receive HARQ feedback for each of the one or more subframes of the radio frame during each of one or more corresponding uplink subframes, wherein each corresponding uplink subframe occurs during the radio frame or during a next radio frame.

14. The apparatus of claim 9, wherein the instructions are executable by the processor to:

perform clear channel assessment (CCA) to determine whether the unlicensed spectrum is available; and access the unlicensed spectrum during the radio frame when the unlicensed spectrum is determined to be available.

15. The apparatus of claim 9, wherein the instructions are executable by the processor to:

transmit a request to send (RTS) signal to request channel access over the unlicensed spectrum; and receive, in response to the RTS signal, a clear to send (CTS) signal when the unlicensed spectrum is available for transmission.

16. The apparatus of claim 9, wherein the instructions are executable by the processor to:

transmit a clear to send (CTS) signal when the unlicensed spectrum is available.

17. A method for wireless communications, comprising:

receiving a transmission from a user equipment (UE);

transmitting, in a radio frame over an unlicensed spectrum to the UE, a sequence number corresponding to the radio frame and hybrid automatic repeat request (HARQ) feedback for the transmission received from the UE, wherein the sequence number is transmitted in a numerical order; and determining whether one or more subframes in response to the HARQ feedback are received over the unlicensed spectrum from the UE, wherein, if the one or more subframes are received, then the one or more subframes indicate that the sequence number corresponding to the radio frame was received by the UE in the numerical order.

18. The method of claim 17, further comprising:

transmitting, over the unlicensed spectrum to the UE, a subsequent sequence number corresponding to a subsequent radio frame and subsequent HARQ feedback, wherein the subsequent sequence number is transmitted in the numerical order; and determining whether one or more additional subframes in response to the subsequent HARQ feedback are received over the unlicensed spectrum from the UE, wherein, if the one or more additional subframes are received, then the one or more additional subframes indicate that the subsequent sequence number corresponding to the subsequent radio frame was received by the UE in the numerical order.

19. The method of claim 17, wherein:

the HARQ feedback comprises one or more HARQ feedback messages; and receiving the one or more subframes comprises receiving a separate subframe for each of the one or more HARQ feedback messages.

20. The method of claim 17, wherein receiving the one or more subframes comprises:

receiving each of the one or more subframes during each of one or more corresponding uplink subframes, wherein each corresponding uplink subframe occurs during the radio frame.

21. The method of claim 17, further comprising:

performing a clear channel assessment (CCA) to determine whether the unlicensed spectrum is available; and accessing the unlicensed spectrum during the radio frame when the unlicensed spectrum is determined to be available.

22. An apparatus for wireless communications, comprising:

a processor;

memory in electronic communication with the processor; and instructions stored in the memory, and executable by the processor to:

receive a transmission from a user equipment (UE);

transmit, in a radio frame over an unlicensed spectrum to the UE, a sequence number corresponding to the radio frame and hybrid automatic repeat request (HARQ) feedback for the transmission received from the UE, wherein the sequence number is transmitted in a numerical order; and determine whether one or more subframes in response to the HARQ feedback are received over the unlicensed spectrum from the UE, wherein, if the one or more subframes are received, then the one or more subframes indicate that the sequence number corresponding to the radio frame was received by the UE in the numerical order.

23. The apparatus of claim 22, wherein the instructions are executable by the processor to:

transmit, over the unlicensed spectrum to the UE, a subsequent sequence number corresponding to a subsequent radio frame and subsequent HARQ feedback, wherein the subsequent sequence number is transmitted in the numerical order; and determine whether one or more additional subframes in response to the subsequent HARQ feedback are received over the unlicensed spectrum from the UE, wherein, if the one or more additional subframes are received, then the one or more additional subframes indicate that the subsequent sequence number corresponding to the subsequent radio frame was received by the UE in the numerical order.

24. The apparatus of claim 22, wherein:

the HARQ feedback comprises one or more HARQ feedback messages; and wherein the instructions to receive the one or more subframes are executable by the processor to receive a separate subframe for each of the one or more HARQ feedback messages.

25. The apparatus of claim 22, wherein the instructions to receive the one or more subframes are executable by the processor to:

receive each of the one or more subframes during each of one or more corresponding uplink subframes, wherein each corresponding uplink subframe occurs during the radio frame.

26. The apparatus of claim 22, wherein the instructions are executable by the processor to:

perform clear channel assessment (CCA) to determine whether the unlicensed spectrum is available; and access the unlicensed spectrum during the radio frame when the unlicensed spectrum is determined to be available.

\* \* \* \* \*